(12) United States Patent
Petite et al.

(10) Patent No.: US 7,468,661 B2
(45) Date of Patent: *Dec. 23, 2008

(54) SYSTEM AND METHOD FOR MONITORING AND CONTROLLING REMOTE DEVICES

(75) Inventors: Thomas D. Petite, Douglasville, GA (US); Richard M. Huff, Conyers, GA (US)

(73) Assignee: Hunt Technologies, Inc., Lafayette, IN (US)

( * ) Notice: Subject to any disclaimer, the term of this patent is extended or adjusted under 35 U.S.C. 154(b) by 306 days.

This patent is subject to a terminal disclaimer.

(21) Appl. No.: 11/395,685

(22) Filed: Mar. 31, 2006

(65) Prior Publication Data

US 2006/0181406 A1    Aug. 17, 2006

Related U.S. Application Data

(63) Continuation of application No. 10/139,492, filed on May 6, 2002, now Pat. No. 7,053,767, which is a continuation of application No. 09/439,059, filed on Nov. 12, 1999, now Pat. No. 6,437,692, and a continuation-in-part of application No. 09/412,895, filed on Oct. 5, 1999, now Pat. No. 6,218,953, which is a continuation-in-part of application No. 09/271,517, filed on Mar. 18, 1999, now abandoned, and a continuation-in-part of application No. 09/172,554, filed on Oct. 14, 1998, now Pat. No. 6,028,522, and a continuation-in-part of application No. 09/102,178, filed on Jun. 22, 1998, now Pat. No. 6,430,268.

(60) Provisional application No. 60/146,817, filed on Aug. 2, 1999.

(51) Int. Cl.
*G08B 21/00* (2006.01)

(52) U.S. Cl. .................. 340/540; 340/531; 340/539.17; 340/3.1; 340/521; 340/870.01; 340/870.03; 340/870.07; 340/870.08; 340/870.16; 340/870.17; 700/108; 702/56

(58) Field of Classification Search ................. 340/540, 340/539.17, 539.26, 531, 521, 870.01, 870.03, 340/870.07, 870.08, 870.16, 870.17, 988; 700/108; 702/56; 455/7; 370/238; 343/711, 343/700 R, 720

See application file for complete search history.

(56) References Cited

U.S. PATENT DOCUMENTS 5,845,230 A * 12/1998 Lamberson .................. 702/56

(Continued)

*Primary Examiner*—Toan N Pham
(74) *Attorney, Agent, or Firm*—Thomas, Kayden, Horstemeyer & Risley, LLP

(57) ABSTRACT

The present invention is generally directed to a system for monitoring a variety of environmental and/or other conditions within a defined remotely located region. In accordance with one aspect of the invention, a system is configured to monitor utility meters in a defined area. The system is implemented by using a plurality of wireless transmitters, wherein each wireless transmitter is integrated into a sensor adapted to monitor a particular data input. The system also includes a plurality of transceivers that are dispersed throughout the region at defined locations. The system uses a local gateway to translate and transfer information from the transmitters to a dedicated computer on a network. The dedicated computer, collects, compiles, and stores the data for retrieval upon client demand across the network. The computer further includes means for evaluating the received information and identifying an appropriate control signal, the system further including means for applying the control signal at a designated actuator.

14 Claims, 18 Drawing Sheets

U.S. PATENT DOCUMENTS

| | | | |
|---|---|---|---|
| 5,917,405 A * | 6/1999 | Joao | 340/426.17 |
| 6,044,062 A * | 3/2000 | Brownrigg et al. | 370/238 |
| 6,366,217 B1 * | 4/2002 | Cunningham et al. | 340/870.31 |
| 7,117,239 B1 * | 10/2006 | Hansen | 709/200 |
| 7,254,372 B2 * | 8/2007 | Janusz et al. | 455/88 |
| 7,304,587 B2 * | 12/2007 | Boaz | 340/870.02 |
| 2004/0090950 A1 * | 5/2004 | Lauber et al. | 370/352 |

\* cited by examiner

FIG. 11    Message Structure

| To Addr. (1-6) | From Addr. (6) | Pkt. No. (1) | Pkt. Max. (1) | Pkt. Lngth. (1) | Cmd. (1) | Data (0-238) | CkH (1) | CkL (1) |
|---|---|---|---|---|---|---|---|---|

The order of appearance remains fixed although byte position number in each packet may vary due to one or more of the following reasons:
1. Scalability of the "TO ADDRESS" (1 to 6 Bytes).
2. The CMD Byte.
3. Scalability of the Data portion of the message (0 to 238 Bytes)

"To Address" Byte Assignment:

| | |
|---|---|
| MSB - Byte 1<br>Device Type | FF-F0 (16) - Broadcast All Devices (1 Byte Address)<br>EF-1F (224) - Device Type Base (2 to 6 Byte Address)<br>0F-00 (16) - Personal Transceiver Identification (6 Byte Address) |
| Byte 2<br>Mfg./Owner ID | FF-F0 (16) - Broadcast all Devices (Byte 1 Type)<br>(2 Byte Broadcast Address)<br>EF-00 (240) - Mfg./Owner Code Identification Number |
| Byte 3<br>Mfg./Owner Extension ID | FF-F0 (16) - Broadcast all Devices (Byte 1 & Byte 2 Type)<br>(3 Byte Broadcast Address)<br>EF-00 (240) - Device Type/Mfg./Owner Code ID Number |
| Byte 4 | FF-F0 (16) - Broadcast all Devices (Byte 1 & Byte 2 Type)<br>(4 Byte Broadcast Address)<br>EF-00 (240) - ID Number |
| Byte 5 | (FF-00) 256 - Identification Number |
| Byte 6 | (FF-00) 256 - Identification Number |

"From Address" Byte Assignment:

| | |
|---|---|
| From Address | (FF-00) Full "ID" of Originating Device (up to 6 Bytes) |
| Packet Number | (FF-00) Packet Number of Msg. longer than 256 Bytes |
| Packet Max. | (FF-00) Number of Packets in Message over 256 Bytes |
| Packet Length | (FF-00) Length (in Bytes) of Packet/Message Transmission |
| Command | (FF-00) Command Byte |
| Data | (FF-00) Data as required by specific command |
| ChkH | (FF-00) Packet Checksum, High Byte |
| ChkL | (FF-00) Packet Checksum, Low Byte |

* Packet Length - 13 Bytes (Min.) / 256 Bytes (Max.)

Sample Messages

Central Server to Personal Transceiver - Broadcast Message - FF (Emergency)

Byte Count = 12

| To Addr. (FF) | From Addr. (12345678) | Pkt. No. (00) | Pkt. Max. (00) | Pkt. Lngth. (0C) | Cmd. (FF) | CkH (02) | CkL (9E) |
|---|---|---|---|---|---|---|---|

---

First Transceiver to Repeater (Transceiver)
Broadcast Message - FF (Emergency)

Byte Count = 17

| To Addr. (F0) | From Addr. (12345678) | Pkt. No. (00) | Pkt. Max. (00) | Pkt. Lngth. (11) | Cmd. (FF) | Data (A000123456) | CkH (03) | CkL (A0) |
|---|---|---|---|---|---|---|---|---|

Note: Additional Transceiver Re-Broadcasts do not change the message.
The messages are simply received and re-broadcast.

---

Message to Device "A0" From Device "E1" Command - "08" (Respond to PING)
Response will reverse "To" and "From" Addresses Byte Count = 17

| To Addr. (A012345678) | From Addr. (E112345678) | P # (00) | P Max. (00) | P Lngth. (11) | Cmd. (08) | Data (A5) | CkH (04) | CkL (67) |
|---|---|---|---|---|---|---|---|---|

FIG. 12

SYSTEM AND METHOD FOR MONITORING AND CONTROLLING REMOTE DEVICES

CROSS-REFERENCE TO RELATED APPLICATIONS

This application is a continuation of U.S. application Ser. No. 10/139,492, entitled, "System and Method for Monitoring and Controlling Remote Devices," filed on May 6, 2002, now U.S. Pat. No. 7,053,767 which itself is continuation of U.S. application Ser. No. 09/439,059, filed on Nov. 12, 1999 and entitled "System and Method for Monitoring and Controlling Remote Devices," and bearing U.S. Pat. No. 6,437, 692. U.S. Pat. No. 6,437,692 is a continuation-in-part of U.S. patent applications Ser. No. 09/271,517, filed Mar. 18, 1999 now abandoned and entitled, "System For Monitoring Conditions in a Residential Living Community"; Ser. No. 09/102, 178 filed Jun. 22, 1998 now U.S. Pat. No. 6,430,268 and entitled, "Multi-Function General Purpose Transceiver"; Ser. No. 09/172,554, filed Oct. 14, 1998 and entitled, "System for Monitoring the Light Level Around an ATM," now U.S. Pat. No. 6,028,522; Ser. No. 09/412,895, filed Oct. 5, 1999 and entitled, "System and Method for Monitoring the Light Level Around an ATM," now U.S. Pat. No. 6,218,953; and further claims the benefit of U.S. Provisional Application Ser. No. 60/146,817, filed Aug. 2, 1999 and entitled, "System and Method for Monitoring and Controlling Residential Devices." Each of the above identified applications and patents are incorporated herein by reference in their entireties.

BACKGROUND OF THE INVENTION

The present invention generally relates to remotely operated systems, and more particularly to a computerized system for monitoring, reporting on, and controlling remote systems by transferring information signals through a wide area network (WAN) and using software applications hosted on a connected server to appropriately process the information.

DISCUSSION OF THE RELATED ART

As is known, there are a variety of systems for monitoring and controlling manufacturing processes, inventory systems, emergency control systems, and the like. Most automatic systems use remote sensors and controllers to monitor and automatically respond to system parameters to reach desired results. A number of control systems utilize computers to process system inputs, model system responses, and control actuators to implement process corrections within the system. Both the electric power generation and metallurgical processing industries have had success controlling production processes by implementing computer controlled control systems in individual plants.

One way to classify control systems is by the timing involved between subsequent monitoring occurrences. Monitoring processes can be classified as aperiodic or random, periodic, and real-time. A number of remotely distributed service industries implement the monitoring and controlling process steps through manual inspection and intervention.

Aperiodic monitoring systems (those that do not operate on a predetermined cycle) are inherently inefficient as they require a service technician to physically traverse an area to record data, repair out of order equipment, add inventory to a vending machine, and the like. Such service trips are carried out in a number of industries with the associated costs being transferred to the consumers of the service.

Conversely, utility meter monitoring, recording, and client billing are representative of a periodic monitoring system. In the past, utility providers sent a technician from meter to meter on a periodic basis to verify meter operation and to record utility use. One method of cutting operating expenses in the utility industry involved increasing the period at which manual monitoring and meter data recording was performed. While this method decreased the monitoring and recording expense associated with more frequent meter observation and was convenient for consumers who favor the consistent billed amounts associated with "budget billing," the utility provider retained the costs associated with less frequent meter readings and the processing costs associated with reconciling consumer accounts.

Lastly, a number of environmental and safety systems require constant or real-time monitoring. Heating, ventilation, and air-conditioning systems, fire reporting and damage control systems, alarm systems, and access control systems are representative systems that utilize real-time monitoring and often require immediate feedback and control. These real-time systems have been the target of control systems theory and application thereof for some time.

A problem with expanding the use of control systems technology to distributed systems are the costs associated with the sensor-actuator infrastructure required to monitor and control functions within such systems. The typical approach to implementing control system technology is to install a local network of hard-wired sensors and actuators along with a local controller. Not only is there expense associated with developing and installing appropriate sensors and actuators but the added expense of connecting functional sensors and controllers with the local controller. Another prohibitive cost associated with applying control systems technology to distributed systems is the installation and operational expense associated with the local controller.

Accordingly, an alternative solution to applying monitoring and control system solutions to distributed systems that overcomes the shortcomings of the prior art is desired.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a cost effective method of monitoring and controlling remote devices. More specifically, the present invention is directed to a computerized system for monitoring, reporting, and controlling remote systems and system information transfer by transmitting information signals to a WAN gateway interface and using applications on a connected server to process the information. Because the applications server is integrated on a WAN, Web browsers can be used by anyone with Internet access (and the appropriate access permissions) to view and download the recorded data.

In accordance with a broad aspect of the invention, a system is provided having one or more sensors to be read and/or actuators to be controlled remotely, ultimately through a computer on the Internet. The sensors and/or actuators are interfaced with wireless transceivers that transmit and/or receive data to and from the Internet. In this regard, additional wireless transceivers may relay information between the transceivers disposed in connection with the sensors and actuators and a gateway to the Internet. It should be appreciated that, a portion of the information communicated includes data that uniquely identifies the sensors and/or actuators.

In accordance with one aspect of the invention, a system is configured to monitor and report system parameters. The system is implemented by using a plurality of wireless transceivers. At least one wireless transceiver is interfaced with a sensor, transducer, actuator or some other device associated with the application parameter of interest. In this regard, the term "parameter" is broadly construed and may include, but is not limited to, a system alarm condition, a system process variable, an operational condition, etc. The system also includes a plurality of transceivers that act as signal repeaters that are dispersed throughout the nearby geographic region at defined locations. By defined locations, it is meant only that the location of each transceiver is known to a central computer. The central computer may be informed of transceiver physical locations after permanent installation, as the installation location of the transceivers is not limited. Each transceiver that serves to repeat a previously generated data signal may be further integrated with its own unique sensor or a sensor actuator combination as required. Additional transceivers may be configured as stand-alone devices that serve to simply receive, format, and further transmit system data signals. Further, the system includes a local data formatter that is configured to receive information communicated from the transceivers, format the data, and forward the data via the gateway to one or more servers interconnected with the WAN. The server further includes means for evaluating the received information and identifying the system parameter and the originating location of the parameter. The server also includes means for updating a database or further processing the reported parameters.

Consistent with the broader concepts of the invention, the "means" for evaluating the received information and the "means" for reporting system parameters are not limited to a particular embodiment or configuration. Preferably, these "means" will be implemented in software that is executed by a processor within a server integrated with the Internet. However, dedicated WANs or Intranets are suitable backbones for implementing defined system data transfer functions consistent with the invention.

In one embodiment, a client retrieves configured system data by accessing an Internet Web site. In such an embodiment, a system consistent with the present invention acts as a data collector and formatter with data being delivered upon client request, with availability twenty-four hours a day, seven days a week.

In more robust embodiments, a system can be configured to collect, format, and deliver client application specific information on a periodic basis to predetermined client nodes on the WAN. In these embodiments, client intervention would serve to close the feedback loop in the control system.

In yet another embodiment, a system can be configured to collect, format, and control client application specific processes by replacing a local control computer with a WAN interfaced server and integrating system specific actuators with the aforementioned system transceivers.

It should be further appreciated that the information transmitted and received by the wireless transceivers may be further integrated with other data transmission protocols for transmission across telecommunications and computer networks other than the Internet. In addition, it should be further appreciated that telecommunications and computer networks other than the Internet can function as a transmission path between the networked wireless transceivers, the local gateways, and the central server.

In yet a further embodiment, a system can be configured using the present invention to translate and transmit control signals from an existing local controller via the networked wireless transceivers. In this regard, the system of the present invention would require a data translator to tap into the data stream of an existing control system. Distinct control system signals may be mapped to function codes used by the present invention in order to provide customer access to control system data. In this way, the system of the present invention can be integrated with present data collection and system controllers inexpensively, as customers will only have to add a data translator and a wireless transmitter or transceiver as the application demands. By integrating the present invention with the data stream generated by present monitoring and control systems, potential customers enjoy the benefits of the present invention without the difficulties associated with integrating sensors and actuators to monitor individual system parameters.

BRIEF DESCRIPTION OF DRAWINGS

The accompanying drawings incorporated in and forming a part of the specification, illustrate several aspects of the present invention, and together with the description serve to explain the principles of the invention. In the drawings:

FIG. 11 is a table illustrating the message protocol of the present invention;

FIG. 12 illustrates three sample messages using the message protocol of the present invention;

DETAILED DESCRIPTION OF THE PREFERRED EMBODIMENT

Figure 1:
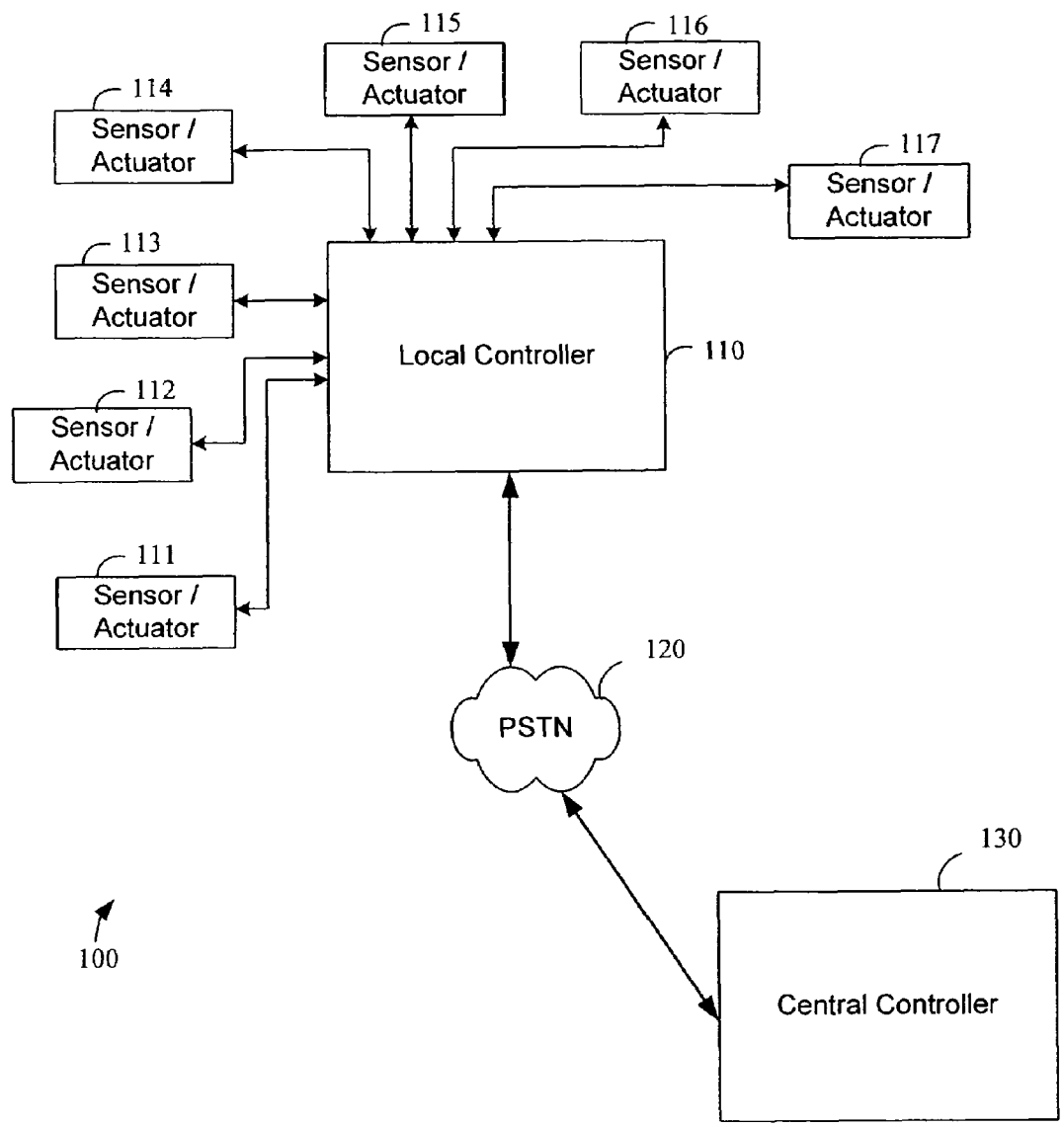
FIG. 1 is a block diagram of a prior art control system.

Having summarized the invention above, reference is now made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Referring now to the drawings, reference is made to FIG. 1, which is a block diagram illustrating certain fundamental components of a prior art control system 100. More particularly, a prior art control system 100 includes a plurality of sensor actuators 111, 112, 113, 114, 115, 116, and 117 electrically coupled to a local controller 110. In a manner well known in the art of control systems, local controller 110 provides power, formats and applies data signals from each of the sensors to predetermined process control functions, and returns control signals as appropriate to the system actuators. Often, prior art control systems are further integrated via the public switched telephone network (PSTN) 120 to a central controller 130. Central controller 130 can be further configured to serve as a technician monitoring station or to forward alarm conditions via PSTN 120 to appropriate public safety officers.

Prior art control systems consistent with the design of FIG. 1 require the development and installation of an application-specific local system controller, as well as, the routing of electrical conductors to each sensor and actuator as the application requires. Such prior art control systems are typically augmented with a central controller 130 that may be networked to the local controller 110 via PSTN 120. As a result, prior art control systems often consist of a relatively heavy design and are subject to a single point of failure should local controller 110 go out of service. In addition, these systems require electrical coupling between the local controller and system sensors and actuators. As a result, appropriately wiring an existing industrial plant can be a dangerous and expensive proposition.

Figure 2:
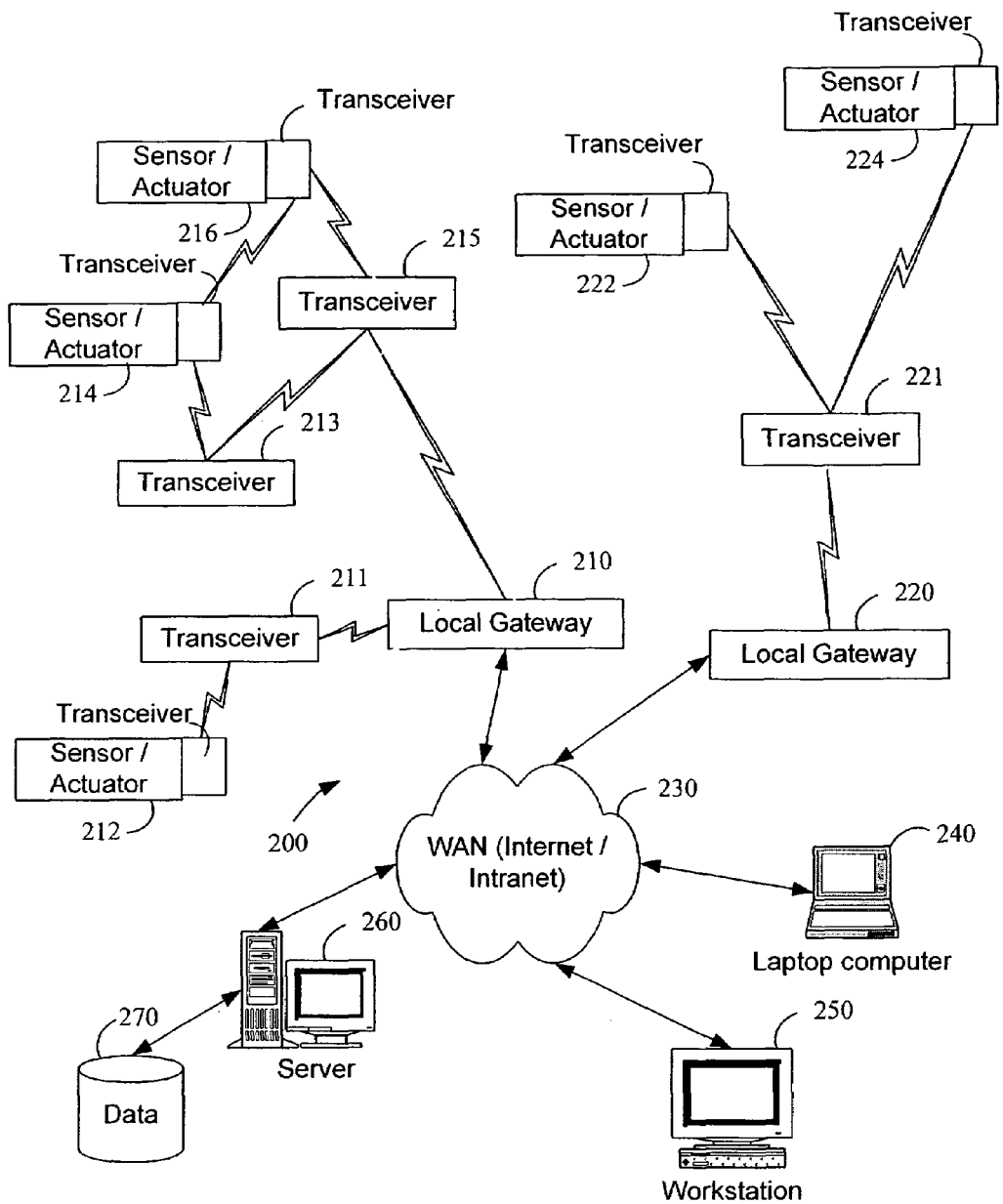
FIG. 2 is a block diagram illustrating a monitoring/control system of the present invention.

Having described a prior art control system and delineated some of its shortcomings, reference is now made to FIG. 2, which is a block diagram that illustrates a control system in accordance with the present invention. Control system 200 consists of one or more sensor/actuators 212, 214, 216, 222, and 224 each integrated with a transceiver. The transceivers are preferably RF (Radio Frequency) transceivers, that are relatively small in size and transmit a relatively low power RF signal. As a result, in some applications, the transmission range of a given transceiver may be relatively limited. As will be appreciated from the description that follows, this relatively limited transmission range of the transceivers is an advantageous and desirable characteristic of control system 200. Although the transceivers are depicted without a user interface such as a keypad, in certain embodiments of the invention the transceivers may be configured with user selectable buttons or an alphanumeric keypad. Often, the transceivers will be electrically interfaced with a sensor or actuator, such as a smoke detector, a thermostat, a security system, etc., where external buttons are not needed.

Control system 200 also includes a plurality of stand-alone transceivers 211, 213, 215, and 221. Each stand-alone transceiver 211, 213, 215, and 221 and each of the integrated transceivers 212, 214, 216, 222, and 224 may be configured to receive an incoming RF transmission (transmitted by a remote transceiver) and to transmit an outgoing signal. This outgoing signal may be another low power RF transmission signal, a higher power RF transmission signal, or alternatively may be transmitted over a conductive wire, fiber optic cable, or other transmission media. The internal architecture of a transceiver integrated with a sensor/actuator 212 and a stand-alone transceiver 211 will be discussed in more detail in connection with FIGS. 3A through 3C. It will be appreciated by those skilled in the art that integrated transceivers 212, 214, 216, 222, and 224 can be replaced by RF transmitters (not shown) for client specific applications that require data collection only.

Local gateways 210 and 220 are configured and disposed to receive remote data transmissions from the various stand-alone transceivers 211, 213, 215, and 221 or integrated transceivers 212, 214, 216, 222, and 224 having an RF signal output level sufficient to adequately transmit a formatted data signal to the gateways. Local gateways 210 and 220 analyze the transmissions received, convert the transmissions into TCP/IP format and further communicate the remote data signal transmissions via WAN 230. In this regard, and as will be further described below, local gateways 210 and 220 may communicate information, service requests, control signals, etc. to remote sensor/actuator transceiver combinations 212, 214, 216, 222, and 224 from server 260, laptop computer 240, and workstation 250 across WAN 230. Server 260 can be further networked with database server 270 to record client specific data.

It will be appreciated by those skilled in the art that if an integrated transceiver (either of 212, 214, 216, 222, and 224) is located sufficiently close to local gateways 210 or 220 such that its RF output signal can be received by a gateway, the RF data signal need not be processed and repeated through stand-alone transceivers 211, 213, 215, or 221.

Figure 6:
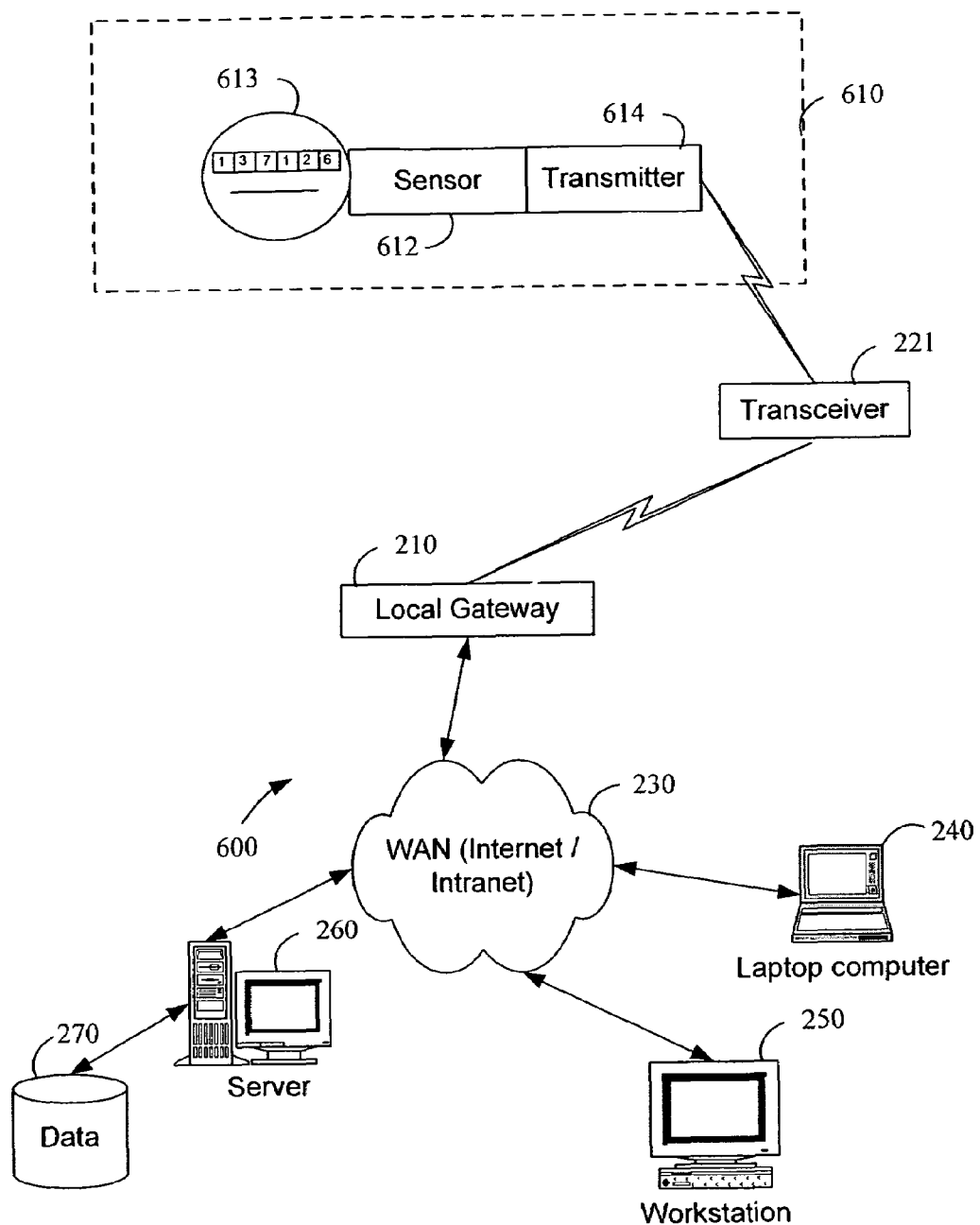
FIG. 6 is a block diagram illustrating a client specific application in accordance with the invention (simple data collection or monitoring)
Figure 7:
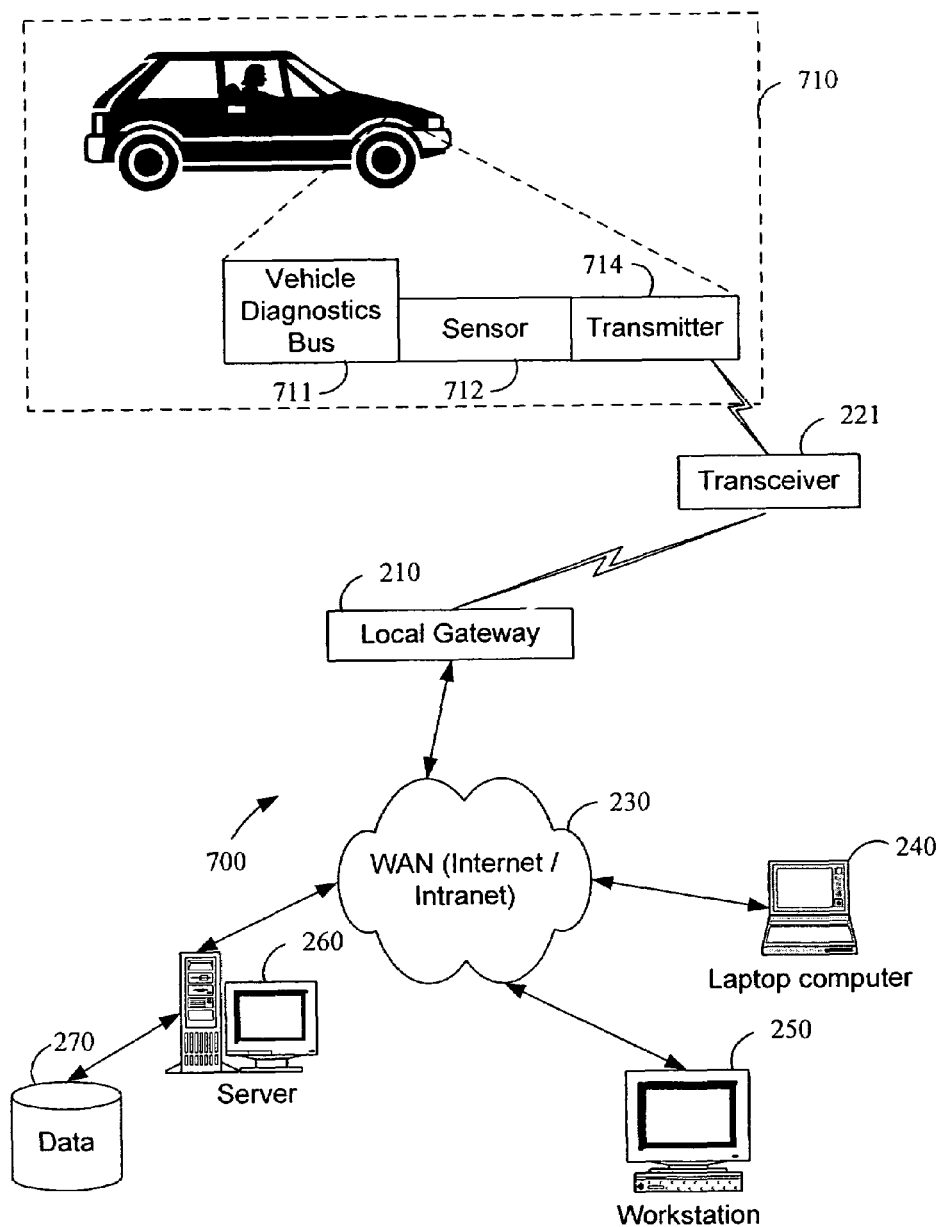
FIG. 7 is a block diagram illustrating another data monitoring and reporting application consistent with the present invention.

It will be further appreciated that a monitoring system constructed in accordance with the teachings of the present invention may be used in a variety of environments. In accordance with a preferred embodiment, a monitoring system such as that illustrated in FIG. 2 may be employed to monitor and record utility usage by residential and industrial customers as illustrated in FIG. 6. Another preferred monitoring system is illustrated in FIG. 7. FIG. 7 depicts the transfer of vehicle diagnostics from an automobile via a RF transceiver integrated with the vehicle diagnostics bus to a local transceiver that further transmits the vehicle information through a local gateway onto a WAN.

Figure 8:
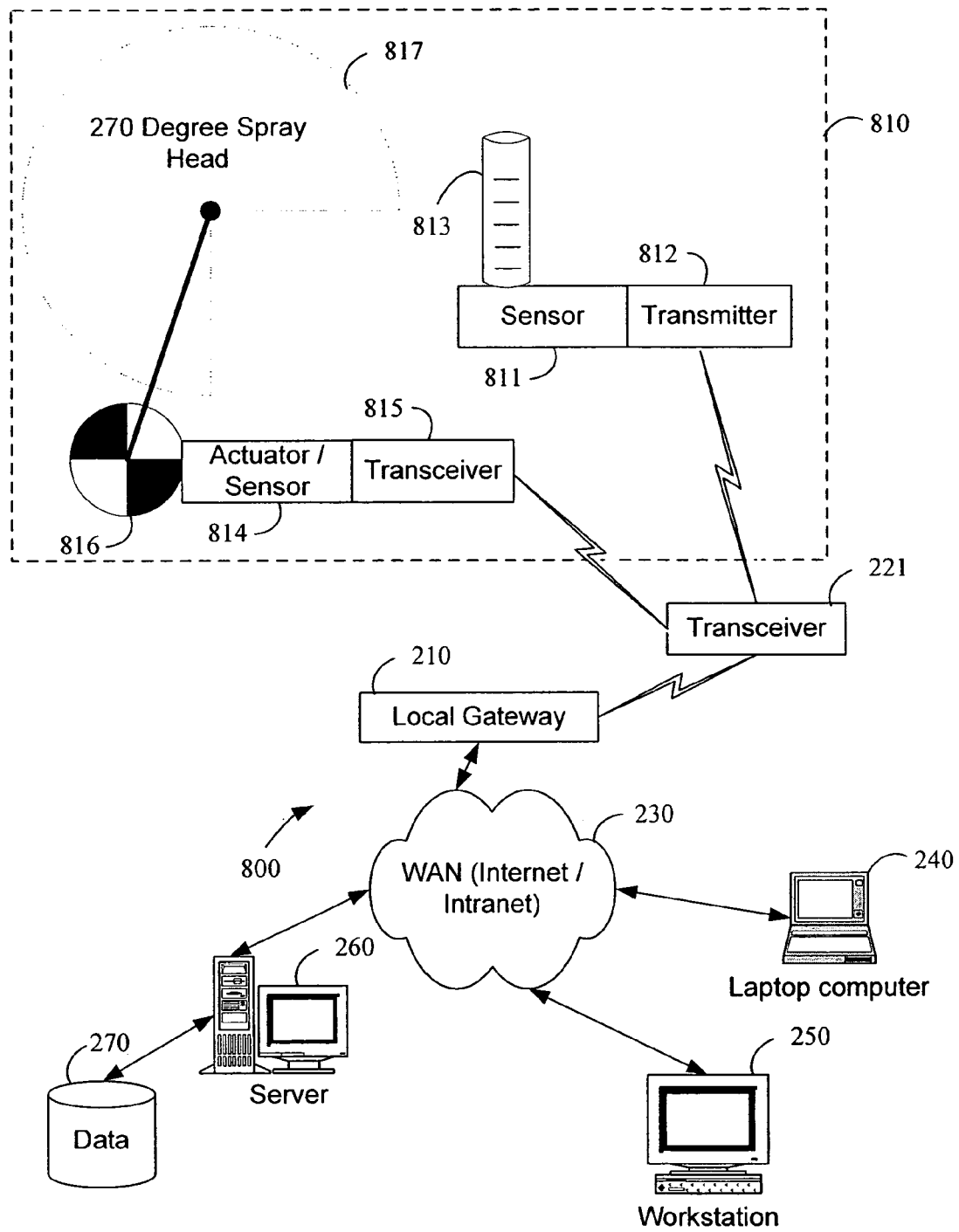
FIG. 8 is a block diagram illustrating a third client specific application in accordance with the invention (monitoring and controlling a process)

It will be further appreciated that a monitoring and control system consistent with the present invention may be used in a variety of environments. In accordance with a preferred embodiment, a control system such as that illustrated in FIG. 2 may be employed to monitor and control an irrigation system as illustrated in FIG. 8.

Figure 9:
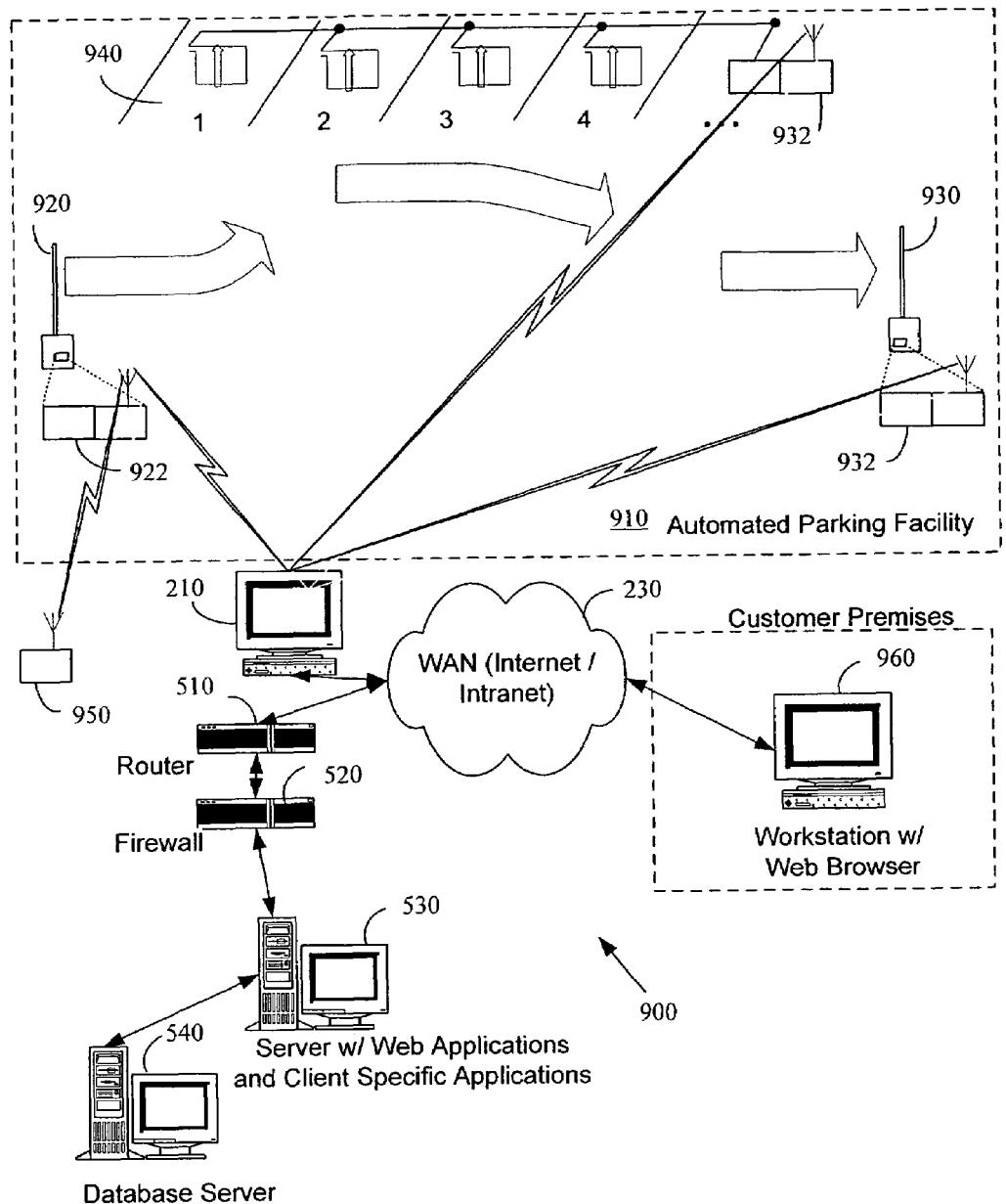
FIG. 9 is a block diagram illustrating the present invention as deployed in a particular business application.

Another preferred control system is illustrated in FIG. 9. FIG. 9 depicts a business application of a control system wherein the operation of a parking facility may be automated.

As will be further appreciated from the discussion herein, transceivers 212, 214, 216, 222, and 224 may have substantially identical construction (particularly with regard to their internal electronics), which provides a cost effective implementation at the system level. Furthermore, a plurality of stand-alone transceivers 211, 213, 215, and 221, which may be identical, are disposed in such a way that adequate coverage in an industrial plant or community is provided. Preferably, stand-alone transceivers 211, 213, 215, and 221 may be dispersed sufficient that only one stand-alone transceiver will pick up a transmission from a given integrated transceiver 212, 214, 216, 222, and 224 (due in part to the low power transmission nature of each transmitter). However, in certain instances two, or even more, stand-alone transceivers may pick up a single transmission. Thus, the local gateways 210 and 220 may receive multiple versions of the same data transmission signal from an integrated transceiver, but from different stand-alone transceivers. The local gateways 210 and 220 may utilize this information to triangulate, or otherwise more particularly assess the location from which the transmission is originating. Due to the transmitting device identification that is incorporated into the transmitted signal, duplicative transmissions (e.g., transmissions duplicated to more than one gateway, or to the same gateway, more than once) may be ignored or otherwise appropriately handled.

In accordance with the preferred embodiment shown in FIG. 2, integrated transceivers 212, 214, 216, 222, and 224 may be disposed within automobiles (see FIG. 7), a rainfall gauge (see FIG. 8), or a parking lot access gate (see FIG. 9) to monitor vehicle diagnostics, total rainfall and sprinkler supplied water, and access gate position, respectively. The advantage of integrating a transceiver, as opposed to a one-way transmitter, into a monitoring device relates to the ability of the transceiver to receive incoming control signals, as opposed to merely transmitting data signals. Significantly, local gateways 210 and 220 may communicate with all system transceivers. Since local gateways 210 and 220 are permanently integrated with WAN 230, server 260 can host application specific software which was typically hosted in an application specific local controller as shown in FIG. 1. Of further significance, the data monitoring and control devices of the present invention need not be disposed in a permanent location as long as they remain within signal range of a system compatible transceiver that subsequently is within signal range of a local gateway interconnected through one or more networks to server 260. In this regard, small application specific transmitters compatible with control system 200 can be worn or carried about one's person as will be further described below.

In one embodiment, server 260 collects, formats, and stores client specific data from each of the integrated transceivers 212, 214, 216, 222, and 224 for later retrieval or access from workstation 250 or laptop 240. In this regard, workstation 250 or laptop 240 can be used to access the stored information through a Web browser in a manner that is well known in the art. In another embodiment, server 260 may perform the additional functions of hosting application specific control system functions and replacing the local controller by generating required control signals for appropriate distribution via WAN 230 and local gateways 210 and 211 to the system actuators. In a third embodiment, clients may elect for proprietary reasons to host control applications on their own WAN connected workstation. In this regard, database 270 and server 260 may act solely as a data collection and reporting device with client workstation 250 generating control signals for the system.

It will be appreciated by those skilled in the art that the information transmitted and received by the wireless transceivers of the present invention may be further integrated with other data transmission protocols for transmission across telecommunications and computer networks other than the Internet. In addition, it should be further appreciated that telecommunications and computer networks other than the Internet can function as a transmission path between the networked wireless transceivers, the local gateways, and the central server.

Figure 3A:
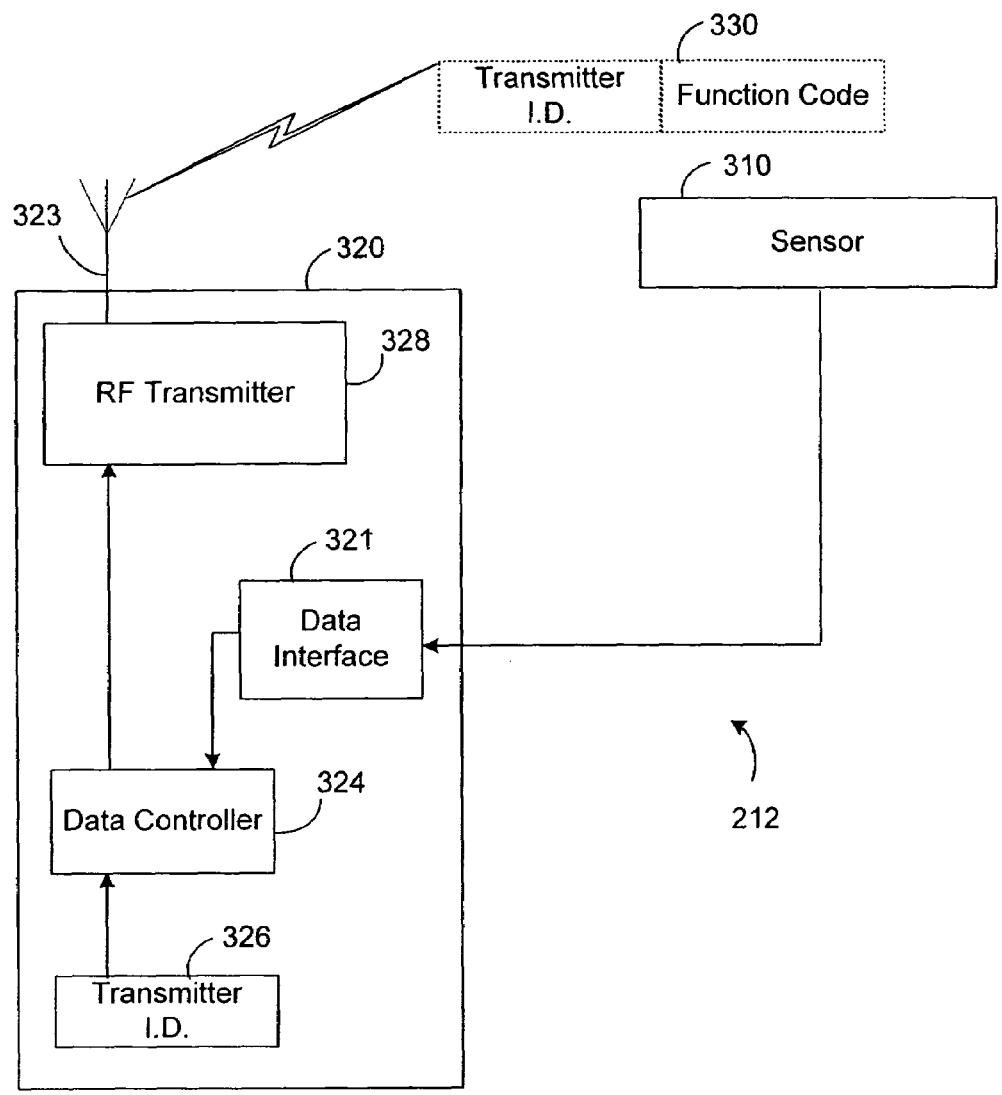
FIG. 3A is a functional block diagram that illustrates a transmitter in accordance with the present invention integrated in a portable device with user operable buttons that trigger data transmissions as desired.

Reference is now made to FIG. 3A, which is a block diagram that illustrates the functional components of a RF transmitter 320, of a type worn or carried by a person, in more detail. Blocks 327 and 329 represent physical buttons, which a user may actuate to cause the RF transmitter 320 to initiate different signal transmissions. In the illustrated embodiment, these include a "transmit" button 327 and a panic or "emergency" button 329. Of course, additional, fewer, or different buttons may be provided on a given transmitter, depending upon the system or implementation desired. Each of these buttons may be electrically wired to a data interface 321 which is configured to receive electrical signals from buttons 327 and 329, and ultimately convey that information to a data formatter 324. In one embodiment, data interface 321 may simply comprise an addressable port that may be read by the data formatter 324.

For example, each of the signal lines extending between the buttons and the data interface 321 may be pulled up by individual pull up resistors (not shown). Depressing any of the individual buttons may ground the electrical signal line interconnecting the respective button and the data interface 321. Data formatter 324 may constantly read from the port defined by data interface 321, and all bit positions should remain high at any given time, if no buttons are depressed. If, however, the data formatter 324 reads a zero in one or more of the bit positions, it then recognizes that one or more of the buttons 327 and 329 have been depressed.

Each transmitter unit may be configured to have a unique identification code (e.g., transmitter identification number) 326, that uniquely identifies the transmitter to the functional blocks of control system 200 (see FIG. 2). This transmitter identification number may be electrically programmable, and implemented in the form of, for example, an EPROM. Alternatively, the transmitter identification number may be set/configured through a series of DIP switches. Additional implementations of the transmitter identification number, whereby the number may be set/configured, may be implemented consistent with the broad concepts of the present invention.

Finally, an additional functional block of the transmitter 320 is a RF transmitter 328. This circuit is used to convert information from digital electronic form into a format, frequency, and voltage level suitable for transmission from antenna 323 via an RF transmission medium.

The data formatter 324 operates to format concise data packets 330 that may be transmitted via RF to a nearby transceiver. From a substantive basis, the information conveyed includes a function code, as well as, a transmitter identification number. As previously mentioned, the transmitter identification number is set for a given transmitter 320. When received by server 260 (see FIG. 2), the transmitter identification number may be used to access a look up table that identifies, for example, the person assigned to carry that particular transmitter. Additional information about the person may also be provided within the lookup table, such as, a physical description, and/or any other information that may be deemed appropriate or useful under the circumstances or implementation of the particular system.

In addition, a function code is communicated from RF transmitter 320 to the nearby transceiver. FIG. 3A illustrates a lookup table 325 that may be provided in connection with data formatter 324. Lookup table 325 may be provided to assign a given and unique function code for each button pressed. For example, transmit button 327 may be assigned a first code to identify the party depressing the button. The emergency button 329 may be assigned a second code. Furthermore, additional codes may be provided as necessary to accommodate additional functions or features of a given transmitter 320. Thus, in operation, a user may depress the emergency button 329, which is detected by the data formatter 324. The data formatter 324 may then use the information pertaining to the emergency button 329 to access a look up table 325 to retrieve a code that is uniquely assigned to emergency button 329. The data formatter 324 may also retrieve the pre-configured transmitter identification number 326 in configuring a data packet 330 for communication via RF signals to a nearby transceiver.

Figure 3B:
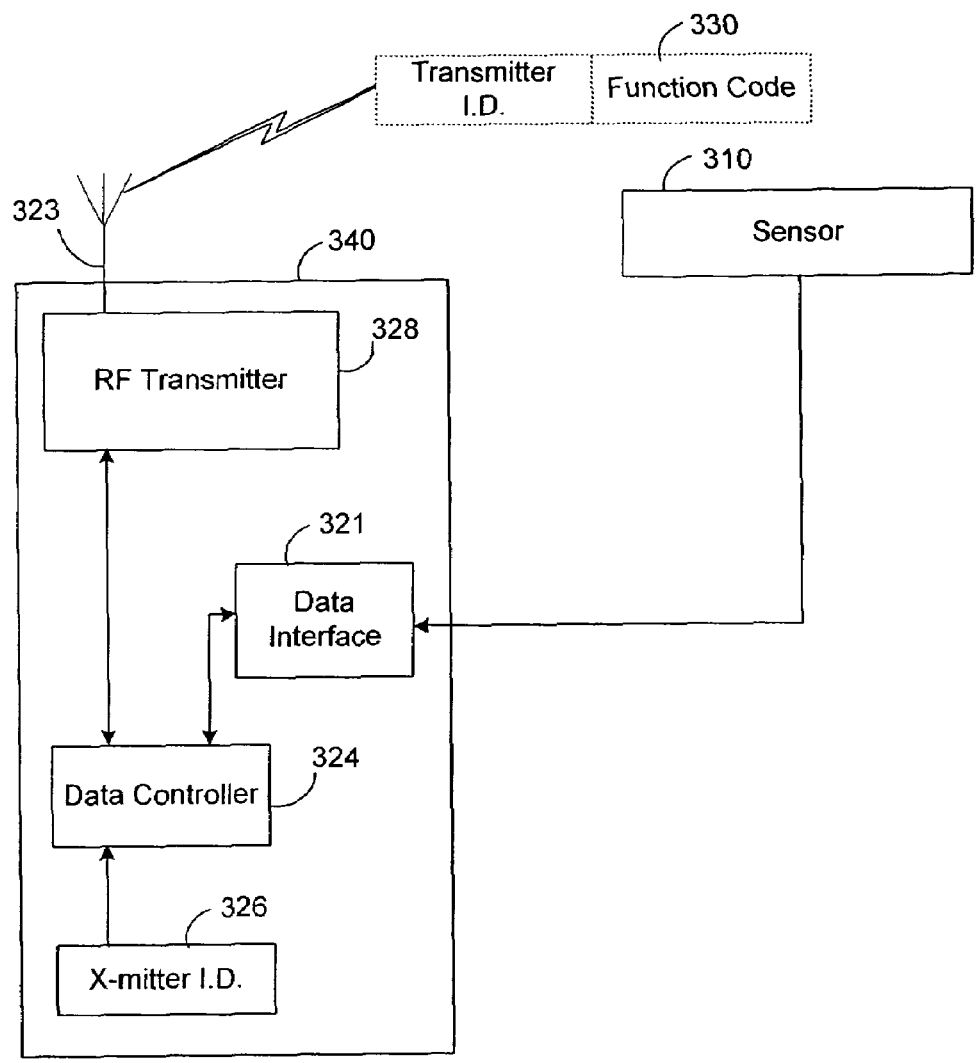
FIG. 3B is a functional block diagram that illustrates the integration of a sensor with a transmitter in accordance with the invention.

Reference is now made briefly to FIG. 3B, which is a block diagram illustrating certain functional blocks of a similar transmitter 340 that may be integrated with sensor 310. For example, sensor 310 in its simplest form could be a two-state device such as a smoke alarm. Alternatively, the sensor 310 may output a continuous range of values to the data interface 321. If the signal output from the sensor 310 is an analog signal, the data interface 321 may include an analog-to-digital converter (not shown) to convert signals output to the actuator 340. Alternatively, a digital interface (communicating digital signals) may exist between the data interface 321 and each sensor 310.

As illustrated, many of the components of RF transmitter 340 are similar to that of RF transmitter 320 and need not be repeated herein. The principal difference between the configurations of RF transmitter 320 of FIG. 3A and the RF transmitter 340 of FIG. 3B lies at the input of the data interface 321. Specifically, RF transmitter 320 included user interface buttons 327 and 329. RF transmitter 340, illustrates electrical integration with sensor 310. Unique transmitter identification code 326 coupled with a function code for a smoke alarm on condition is formatted by data controller 324 for transformation into a RF signal by RF transmitter 328 and transmission via antenna 323. In this way, data packet 330 communicated from transmitter 340 will readily distinguish from similar signals generated by other RF transmitters in the system. Of course, additional and/or alternative configurations may also be provided by a similarly configured RF transmitter. For example, a similar configuration may be provided for a transmitter that is integrated into, for example, a carbon monoxide detector, a door position sensor and the like. Alternatively, system parameters that vary across a range of values may be transmitted by RF transmitter 340 as long as data interface 321 and data controller 324 are configured to apply a specific code, consistent with the input from sensor 310. As long as the code was understood by server 260 or workstation 250 (see FIG. 2) the target parameter could be monitored with the present invention.

Figure 3C:
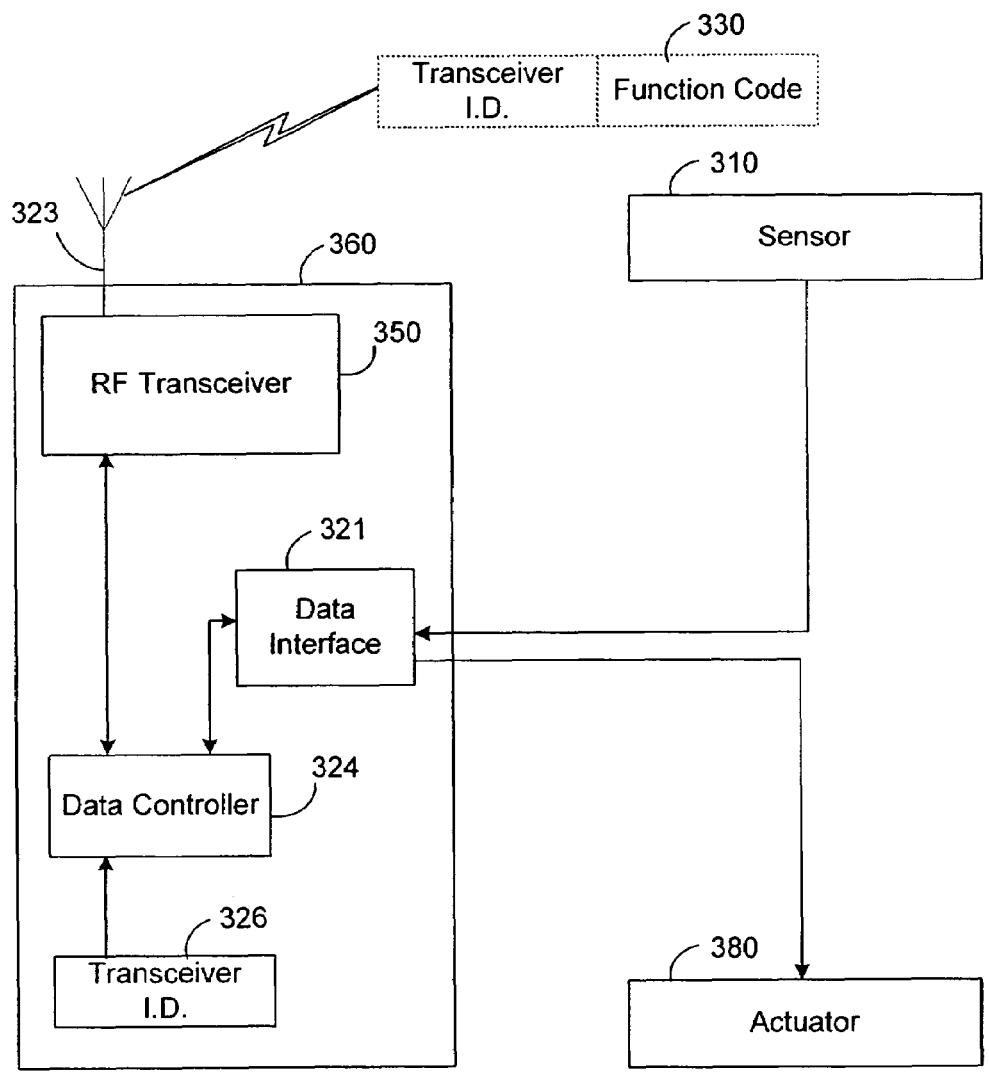
FIG. 3C is a block diagram illustrating a transceiver in accordance with the present invention integrated with a sensor and an actuator.

Reference is now made to FIG. 3C, which is a block diagram similar to that illustrated in FIGS. 3A and 3B, but illustrating a transceiver 360 that is integrated with a sensor 310 and an actuator 380. In this illustration, data interface 321 is shown with a single input from sensor 310. It is easy to envision a system that may include multiple sensor inputs. By way of example, a common home heating and cooling system might be integrated with the present invention. The home heating system may include multiple data interface inputs from multiple sensors. A home thermostat control connected with the home heating system could be integrated with a sensor that reports the position of a manually adjusted temperature control (i.e., temperature set value), as well as, a sensor integrated with a thermister to report an ambient temperature. The condition of related parameters can be input to data interface 321 as well, including the condition of the system on/off switch, and the climate control mode selected (i.e., heat, fan, or AC). In addition, depending upon the specific implementation, other system parameters may be provided to data interface 321 as well.

The addition of actuator 380 to the assembly permits data interface 321 to apply control signals to the manual temperature control for the temperature set point, the climate control mode switch, and the system on/off switch. In this way, a remote workstation 250 or laptop 240 with WAN access (see FIG. 2) could control a home heating system from a remote location.

Again, each of these various input sources are routed to data interface 321 which provides the information to a data controller 324. The data controller may utilize a look up table to access unique function codes that are communicated in data packet 330, along with a transceiver identification code 326 via RF, to a local gateway and further onto a WAN. In general, the operation of transceiver 360 will be similar to that described for a transmitter as previously illustrated in FIGS. 3A and 3B. It is significant to note that data packet 330 will include a concatenation of the individual function codes selected for each of the aforementioned input parameters. As by way of example, server 260 may provide client workstation 250 with a Web page display that models a common home thermostat. As previously described, either server 260 or workstation 250 may include application software that would permit a user with access to remotely adjust the controls on a home heating system by adjusting related functional controls on a graphical user interface updated with feedback from the aforementioned control system.

Figure 3D:
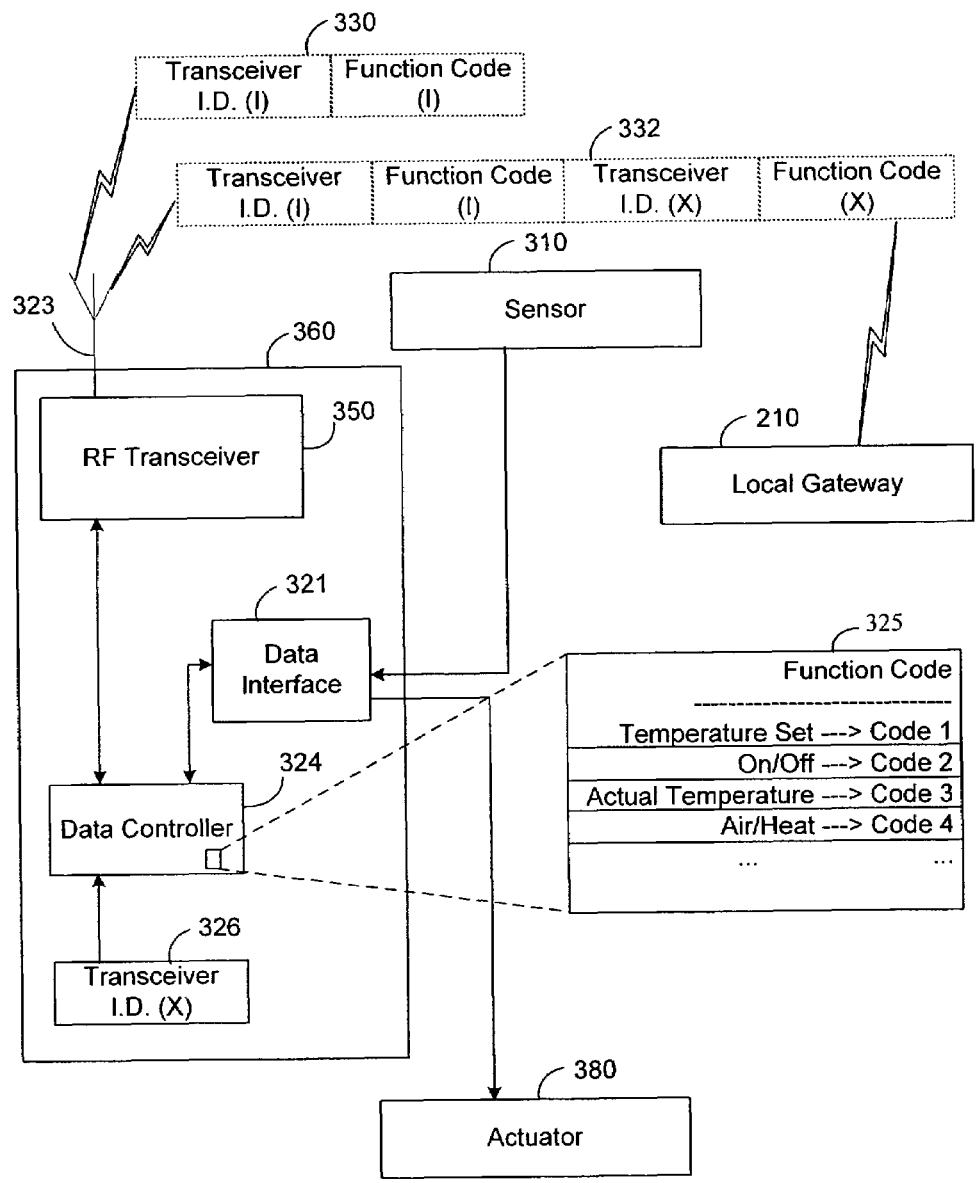
FIG. 3D is a functional block diagram further illustrating the transceiver of FIG. 3C as applied to a heating, ventilation, and air conditioning system controller.

Reference is now made to FIG. 3D, which is a block diagram further illustrating the transceiver of FIG. 3C in light of the home heating system described above. Specifically, transceiver 360 is shown with four specific parameters related to four specific function codes as illustrated in look up table 325. In this regard, sensor(s) 310 (one sensor shown for simplicity) inputs a data signal to data interface 321. Data controller receives an input from data interface 321 that it associates with a specific function code as shown in look up table 325. Data controller 324 assembles data packet 332 by concatenating received data packet 330 with its own transceiver identification code 326 and its own specific function codes. Data packet 332 is configured by RF transceiver 350 for transmission via antenna 323 to either a stand-alone transceiver as shown in FIG. 2, or alternatively, to local gateway 210. It will be appreciated by persons skilled in the art that data interface 321 may be uniquely configured to interface with specialized sensor(s) 310. This circuit, therefore, may differ from transceiver to transceiver, depending upon the remote system parameter that is monitored and the related actuator to be controlled. Implementation of data interface 321 will be understood by persons skilled in the art, and need not be described herein.

Figure 3E:
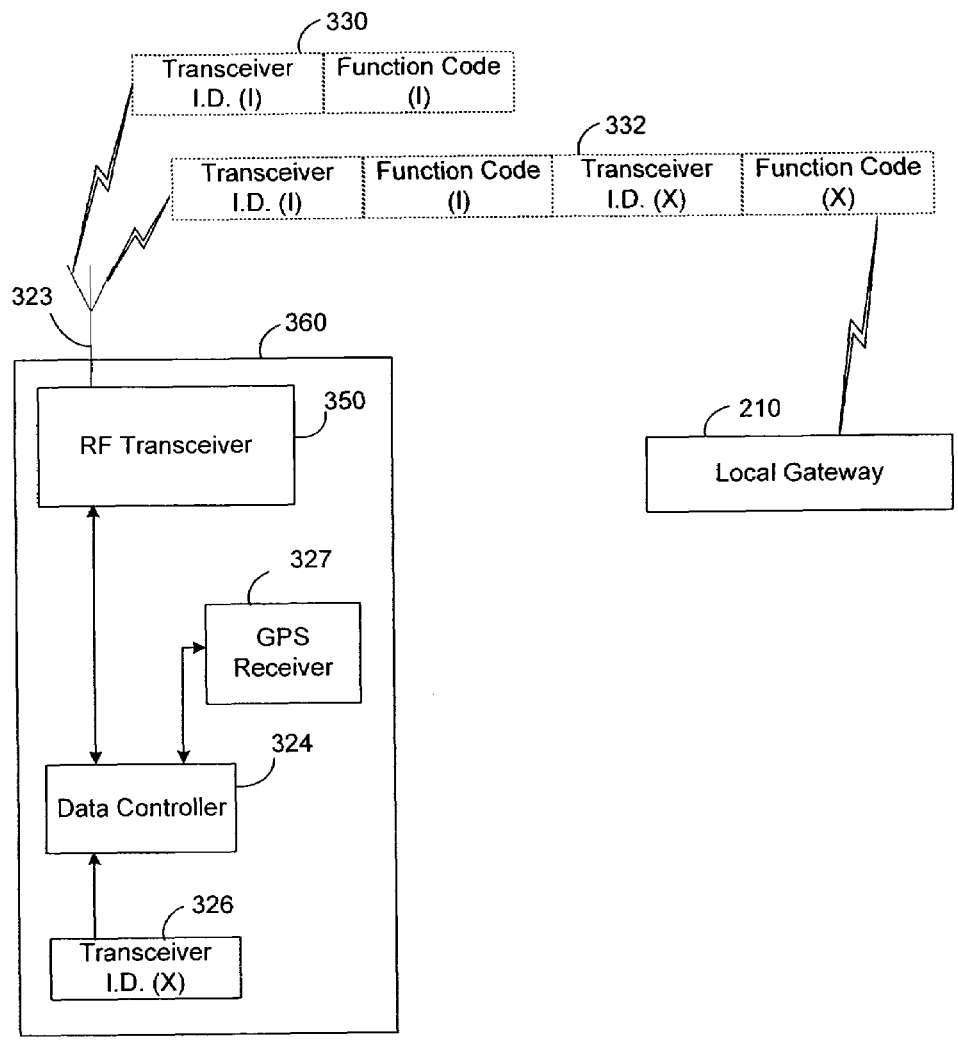
FIG. 3E is a functional block diagram illustrating the combination of the transceiver of FIG. 3D with a global positioning system (GPS) receiver.

Reference is now made to FIG. 3E, which is a block diagram further illustrating the transceiver of FIG. 3C in combination with a GPS receiver. Specifically, GPS receiver 327 replaces data interface 321, sensor 310, and actuator 380 as illustrated in FIG. 3C. In this regard, GPS receiver 327 inputs a data signal containing latitude and longitude coordinates to data controller 324. Data controller 324 assembles data packet 332 by concatenating received data packet 330 with its own transceiver identification code 326 and the coordinates received from GPS receiver 327. Data packet 332 is configured by RF transceiver 350 for transmission via antenna 323 to either a stand-alone transceiver as shown in FIG. 2, or alternatively, to local gateway 210 as previously described.

Figure 4:
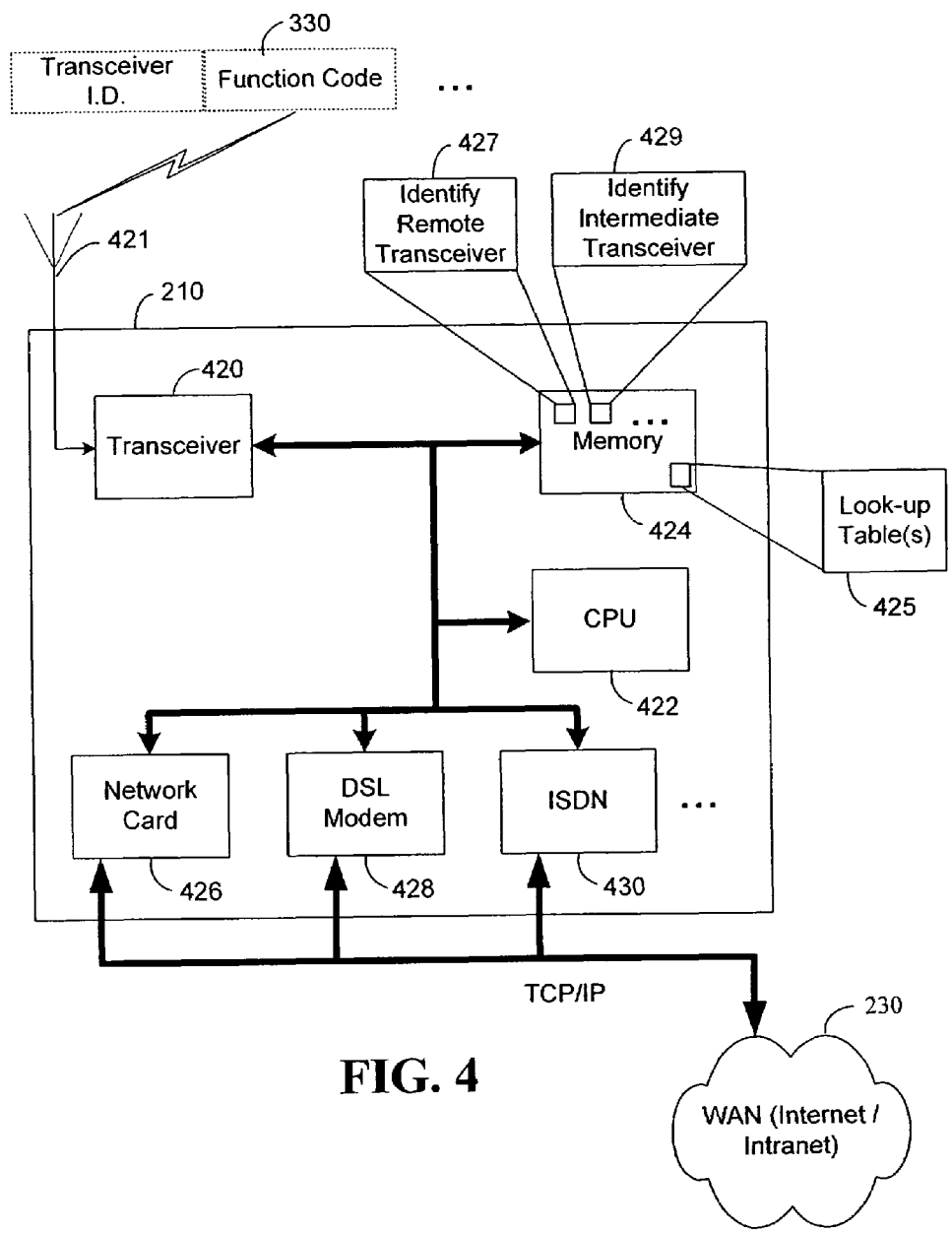
FIG. 4 is a functional block diagram that illustrates the functional components of a local WAN gateway constructed in accordance with the invention.

Having illustrated and described the operation of the various combinations of RF transmitters and transceivers consistent with the present invention, reference is now made to FIG. 4, which is a block diagram illustrating certain principal components and the operation of a local gateway 210 of a control system 100 (see FIG. 2) constructed in accordance with the present invention. The primary physical components that may be provided within local gateway 210 are a transceiver 420, a CPU 422, a memory 424, a network card 426, a DSL modem 428, an ISDN card 430, as well as other components not illustrated in the FIG. 4 that would enable a TCP/IP connection to WAN 230. The transceiver 420 is configured to receive incoming signals consistently formatted in the convention previously described. Local gateway 210 may be configured such that memory 424 includes look up table 425 to assist in identifying the remote and intermediate transceivers used in generating and transmitting the received data transmission. Program code within the memory 424 may also be provided and configured for controlling the operation of a CPU 422 to carry out the various functions that are orchestrated and/or controlled by local gateway 210. For example, memory 424 may include program code for controlling the operation of the CPU 422 to evaluate an incoming data packet to determine what action needs to be taken. In this regard, look up tables 425 may also be stored within memory 424 to assist in this process. Furthermore, memory 424 may be configured with program code configured to identify a remote transceiver 427 or identify an intermediate transceiver 429. Function codes, transmitter and or transceiver identification numbers, may all be stored with associated information within look up tables 425.

Thus, one look up table may be provided to associate transceiver identification numbers with a particular user. Another look up table may be used to associate function codes with the interpretation thereof. For example, a unique code may be associated by a look up table to identify functions such as test, temperature, smoke alarm active, security system breach, etc. In connection with the lookup tables 425, memory 424 may also include a plurality of code segments that are executed by CPU 422, and which largely control the operation of the computer. For example, a first data packet segment 330 may be provided to access a first lookup table to determine the identity of the transceiver which transmitted the received message. A second code segment may be provided to access a second lookup table to determine the proximate location of the message generating transceiver, by identifying the transceiver that relayed the message. A third code segment may be provided to identify the content of the message transmitted. Namely, is it a fire alarm, a security alarm, an emergency request by a person, a temperature control setting, etc. Consistent with the invention, additional, fewer, or different code segments may be provided to carryout different functional operations and data signal transfers throughout the transceiver network.

The local gateway 210 may also include one or more mechanisms through which to communicate with remote systems. For example, the gateway may include a network card 426, which would allow the gateway 210 to communicate across a local area network to a network server, which in turn may contain a backup gateway to WAN 230. Alternatively, local gateway 210 may contain a DSL modem 428, which may be configured to provide a direct dial link to a remote system, by way of the PSTN. Alternatively, local gateway 210 may include an ISDN card 430 configured to communicate via an ISDN connection with a remote system. Other communication gateways may be provided as well to serve as primary and or backup links to WAN 230 or to local area networks that might serve to permit local monitoring of gateway health and data packet control.

Figure 5:
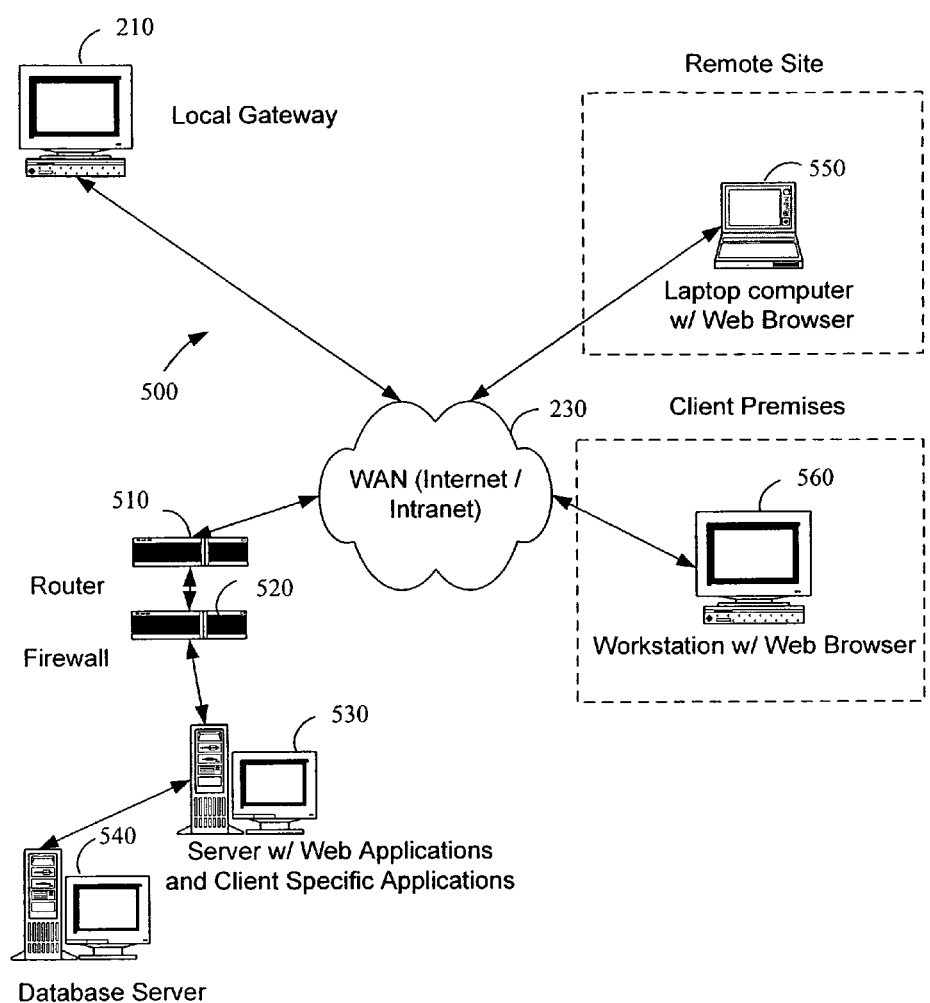
FIG. 5 is a diagram illustrating WAN connectivity in a system constructed in accordance with the invention.

Reference is now made to FIG. 5, which is a diagram illustrating WAN connectivity in a system constructed in accordance with the invention. In this regard, local gateway 210 is configured to transmit control signals and receive data signals using the open data packet protocol as previously described. Local gateway 210 is preferably interconnected permanently on WAN 230 and configured to translate received data signals for WAN transfer via TCP/IP. A server 530 configured with web applications and client specific applications as required is connected to WAN 230 via router 510 and further protected and buffered by firewall 520. Consistent with the present invention, server 530 is assisted in its task of storing and making available client specific data by database server 540. A workstation 560 configured with a Web browser is connected to WAN 230 at client premises by any suitable means known by those of skill in the art. Alternatively, clients may access WAN 230 via remote laptop 550 or other devices configured with a compatible Web browser. In this way, server 530 may provide client specific data upon demand.

Having described the control system of FIG. 2, reference is now made to FIG. 6 which illustrates a specific monitoring embodiment consistent with application of the invention. More specifically, FIG. 6 illustrates a remote utility meter monitoring system 600. Remote utility meter subsystem 610 consists of utility meter 613 and an appropriately integrated sensor 612 wherein the current utility meter operational status and current utility meter usage total is transmitted via functional codes along with a transceiver identification code in a manner previously described by transmitter 614 to stand-alone transceiver 221. Stand-alone transceiver 221 further processes and transmits the encoded data to local gateway 210 which translates the data packet information into TCP/IP format for transfer across WAN 230 to server 260. Server 260 collects and formats the utility meter information for viewing and or retrieval upon client demand in a manner previously described.

Having described a specific client application consistent with the present invention wherein the remote transmitter is permanently integrated with a stationary data input point (a utility meter), reference is now made to FIG. 7 which more fully illustrates the flexibility of the invention. More specifically, FIG. 7 illustrates a remote automotive diagnostics monitoring system 700. Remote automotive diagnostics interface unit 710 consists of sensor 712 integrated with the vehicle diagnostics data bus 711, and transmitter 714 wherein contents of the vehicle diagnostics can be downloaded upon a control signal to sensor 712 from a remote location serviced by local gateway 210. In this manner, a vehicle in need of service but still capable of accessing the vehicle diagnostics codes can be remotely diagnosed by uploading the information through remote automotive diagnostics monitoring system 700 and accessing a custom report created by server 260 in a manner previously described. In this regard, server 260 could be configured to perform any of a number of levels of diagnostics and provide service manual instructions, figures, and local authorized service contact information via WAN 230 on a fee basis or per a predetermined level of service plan.

Having described a monitoring system consistent with the present invention wherein the control signal initiates the monitoring process, reference is now made to FIG. 8. FIG. 8 illustrates a client specific control system consistent with both monitoring and control functions of the invention. More specifically, FIG. 8 illustrates a remote irrigation control system 800. For simplicity, controlled area 810 is represented by a single rain gauge 813 and a single related spray head 817. It is easy to see that such a system could be modified and expanded to monitor and control any of a number of irrigation systems integrated with the present invention.

Controlled area 810 is configured with a rain gauge 813 integrated with sensor 811 wherein rainfall and applied water to the adjacent area is transmitted via functional codes by transmitter 812 along with a related transceiver identification code in a manner previously described to stand-alone transceiver 221. Stand-alone transceiver 221 further processes and transmits the encoded data to local gateway 210 which translates the data packet information into TCP/IP format for transfer across WAN 230 to server 260. Server 260 collects and formats the rain gauge data for viewing or retrieval upon client demand in a manner previously described. Additionally, server 260 may be configured to communicate data to operate spray head 817 by opening water supply valve 816 integrated with actuator 814 by sending a control signal to transceiver 815, per a client directed water application control schedule. Alternatively, a customer workstation 250 could periodically download and review the rain gauge data and could initiate an automatic control signal appropriate with the customer's watering requirements. In yet another embodiment, a customer technician could initiate a control signal upon review of the rain gauge information and making the determination that more water is required.

Reference is now made to FIG. 9 which illustrates the operation of an automated parking control system 900 consistent with the present invention. Automated parking facility 910 consists of a controlled access area with ingress gate 920 and egress gate 930. Both gates 920 and 930 are further configured with a position sensor, an actuator, and transceiver illustrated as ingress assembly 922 and egress assembly 932, respectively. Parking spaces 940 may be configured with vehicle sensors. Sensor-transceiver assembly 932 may be configured to transmit a function code associated with the condition of parking spaces 1, 2, 3, and 4. It will be appreciated by those skilled in the art that the single row of four appropriately configured parking spaces illustrated can be expanded by adding parking spaces configured with vehicle sensors integrated with control system 900 via multiple sensor—transceiver assemblies. Automated parking control system 900 collects data signals from each sensor—transceiver assembly 932, integrated in the system, and compiles a master schedule consisting of scheduled use for each parking space in the automated parking facility. In this manner, a customer with access to WAN 230 and server 530 may make a reservation and or check the availability of parking spaces at the automated parking facility from her home or office (or through any Internet portal). For example, a customer that will be out of town on business for 2 days next week, may access the automated parking control system server 530 by using a Web browser to view parking availability for the target travel dates. The customer may reserve the parking slot by providing a personal transmitter identification code (or other identification code) that the customer intends to use to access and exit the facility the following week. When the customer arrives at the ingress gate 920, the customer may enter the automated parking facility 910 by depressing a button on her personal portable transmitter (see FIG. 3A). Ingress assembly 922 receives and forwards the customer's transmitted identification code to server 530 via gateway 210 and WAN 230 in a manner previously described. Server 530 confirms the customer's reservation, alternatively checks space availability to determine if access should be granted. In addition, server 530 may be further programmed to determine if the particular customer has an established account with the facility owner or whether a credit card payment transaction is in order. Automatic parking facility control system 900 would record the actual use of the reserved parking space for storage on database server 540. Server 530 could retrieve the stored usage information on a periodic basis from database server 540 and generate appropriate bills for each customer.

Alternatively, the customer could reserve the slot by providing billing information via WAN 230 and ingress gate 920 could be further configured with a credit card reader and an alphanumeric keypad interface. Both the credit card reader and the alphanumeric keypad interface could be interconnected to the automated parking facility control system 900 by their own appropriately configured transceiver. Either or both the credit card reader and the alphanumeric keypad interface could be used to identify customers with reservations.

The operator of parking facility control system 900, can expand both the level of security of the parking facility and the services provided by adding networked peripherals in a manner previously described and upgrading the software applications on server 530. For example, by adding automated ingress and egress gates configured to allow the entry and exit of parking facility customers and authorized personnel and configuring the egress gate 930 for vehicles such that only identified customers may exit with a vehicle, both customers and their vehicles are protected from thieves.

A further example of expanding the services offered by automated parking facility control system 900 might consist of offering a schedule of vehicle services that could be scheduled and performed on the vehicles of long-term parking customers. By adding the appropriate interface to server 530, parking facility customers could be prompted when making their reservation with a list of potential vehicle services that could be scheduled and performed by vehicle service technicians during the duration of the customer's business trip. A customer interested in having her automobile's oil changed and tires rotated would authorize and schedule the desired services when arranging her parking reservation. Upon leaving the parking facility at the start of her business trip, the customer could leave her vehicle valet key in an appropriately identified lock box. After her trip is complete, the customer returns to the lot. She gains access to the lot by any of the aforementioned methods and retrieves her valet key by similarly identifying herself as the vehicle owner.

Figure 10:
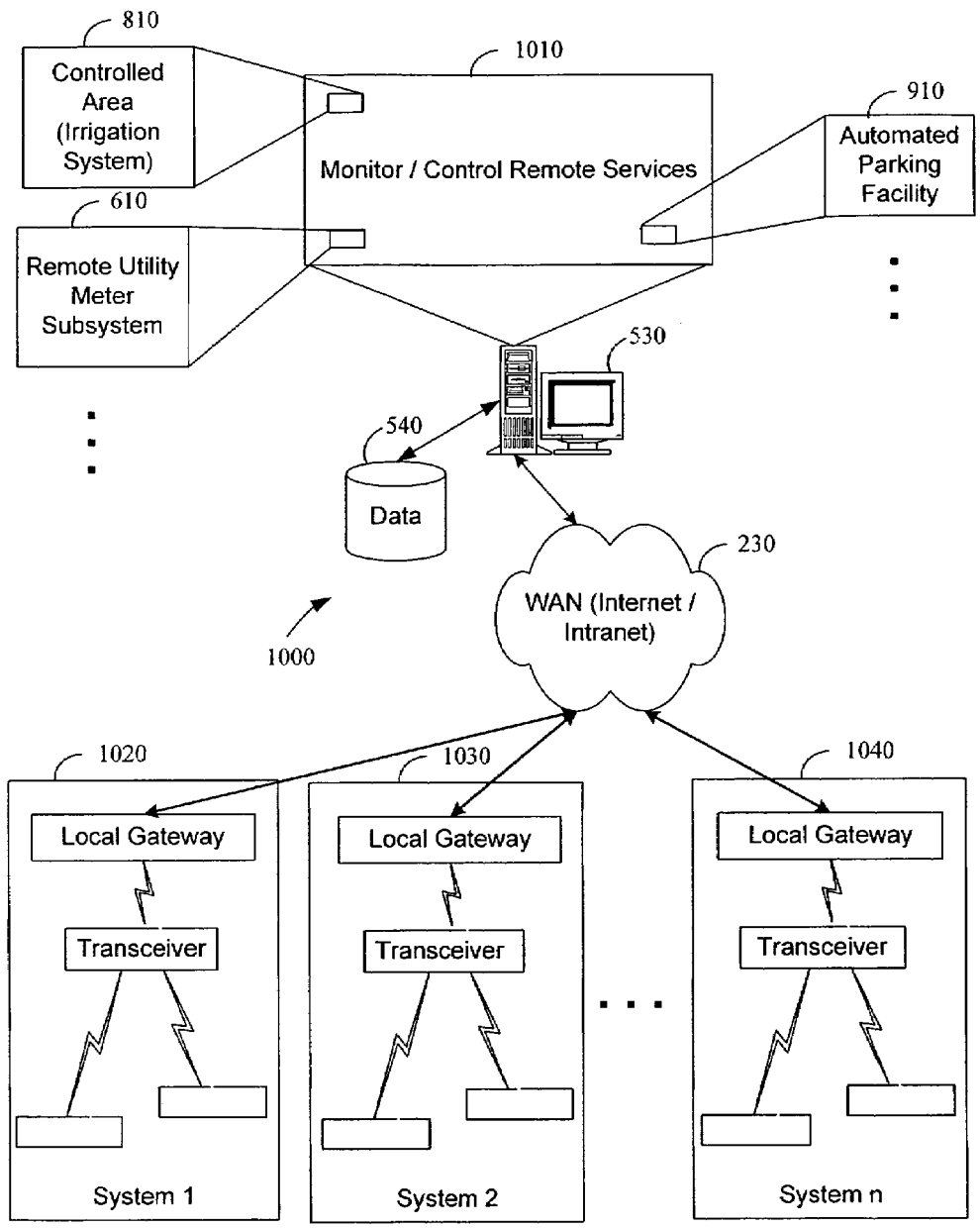
FIG. 10 is a block diagram further illustrating the present invention as deployed in a plurality of business applications.

Having illustrated specific applications using the present invention in FIGS. 6 through 9, reference is now made to FIG. 10 which illustrates a system 1000 that monitors and controls remote data points associated with a plurality of systems. In this embodiment, server 530 may be configured with monitor/control remote services 1010 application-specific software. For example, the controlled area 810 of the irrigation control system shown in FIG. 8, the remote utility meter subsystem 610 of FIG. 6, and the automated parking facility 910 of FIG. 9 may be monitored and remotely controlled (where required) by server 530. In a manner previously described herein, server 530 collects and processes data information transferred and sent over WAN 230 by local gateways coupled via RF links to transceivers and transmitters associated with systems 1020, 1030, and 1040. Alternatively, server 530 initiates control signals that may be sent via the gateways to the appropriate transceivers and transmitters as required. For ease of illustration and description, FIG. 10 shows each of the systems serviced by server 530 requiring its own dedicated local gateway. It will be appreciated by those skilled in the art that small-scale systems jointly located within a geographic area served by an array of transceivers and a gateway may be configured to share the transceiver and gateway infrastructure of a previously installed local system.

Having described the physical layer of a system consistent with the present invention, reference is now made to FIG. 11 which describes the data structure of messages sent and received using the invention. In this regard, the standard message consists of: to address; from address; packet number; maximum packet number, packet length; command; data; packet check sum (high byte); and packet check sum (low byte). The "to address" or message destination consists from 1 to 6 bytes. The "from address" or message source device is coded in a full 6 byte designator. Bytes 11 through 13 are used by the system to concatenate messages of packet lengths greater than 256 bytes. Bytes 14 is a command byte. Byte 14 works in conjunction with bytes 15 through 30 to communicate information as required by system specific commands. Bytes 31 and 32 are packet check sum bytes. The packet check sum bytes are used by the system to indicate when system messages are received with errors. It is significant to note that bytes 31 and 32 may be shifted in the message to replace bytes 15 and 16 for commands that require only one byte. The order of appearance of specific information within the message protocol of FIG. 11 remains fixed although the byte position number in individual message transmissions may vary due to scalability of the "to address," the command byte, and scalability of the data frame.

Having described the general message structure of a message of the present invention, reference is directed to FIG. 12 which illustrates three sample messages. The first message illustrates the broadcast of an emergency message "FF" from a central server with an address "0012345678" to a personal transceiver with an address of "FF."

The second message illustrated reveals how the first message might be sent to a transceiver that functions as a repeater. In this manner, emergency message "FF" from a central server with address "0012345678" is first sent to transceiver "F0." The second message, further contains additional command data "A000123456" that may be used by the system to identify further transceivers to send the signal through on the way to the destination device.

The third message illustrated on FIG. 12 reveals how the message protocol of the present invention may be used to "ping" a remote transceiver in order to determine transceiver health. In this manner, source unit "E112345678" originates a ping request by sending command "08" to a transceiver identified as "A012345678." The response to the ping request can be as simple as reversing the "to address" and the "from address" of the command, such that, a healthy transceiver will send a ping message back to the originating device. The system of the present invention may be configured to expect a return ping within a specific time period. Operators of the present invention could use the delay between the ping request and the ping response to model system loads and to determine if specific system parameters might be adequately monitored and controlled with the expected feedback transmission delay of the system.

Figure 13:
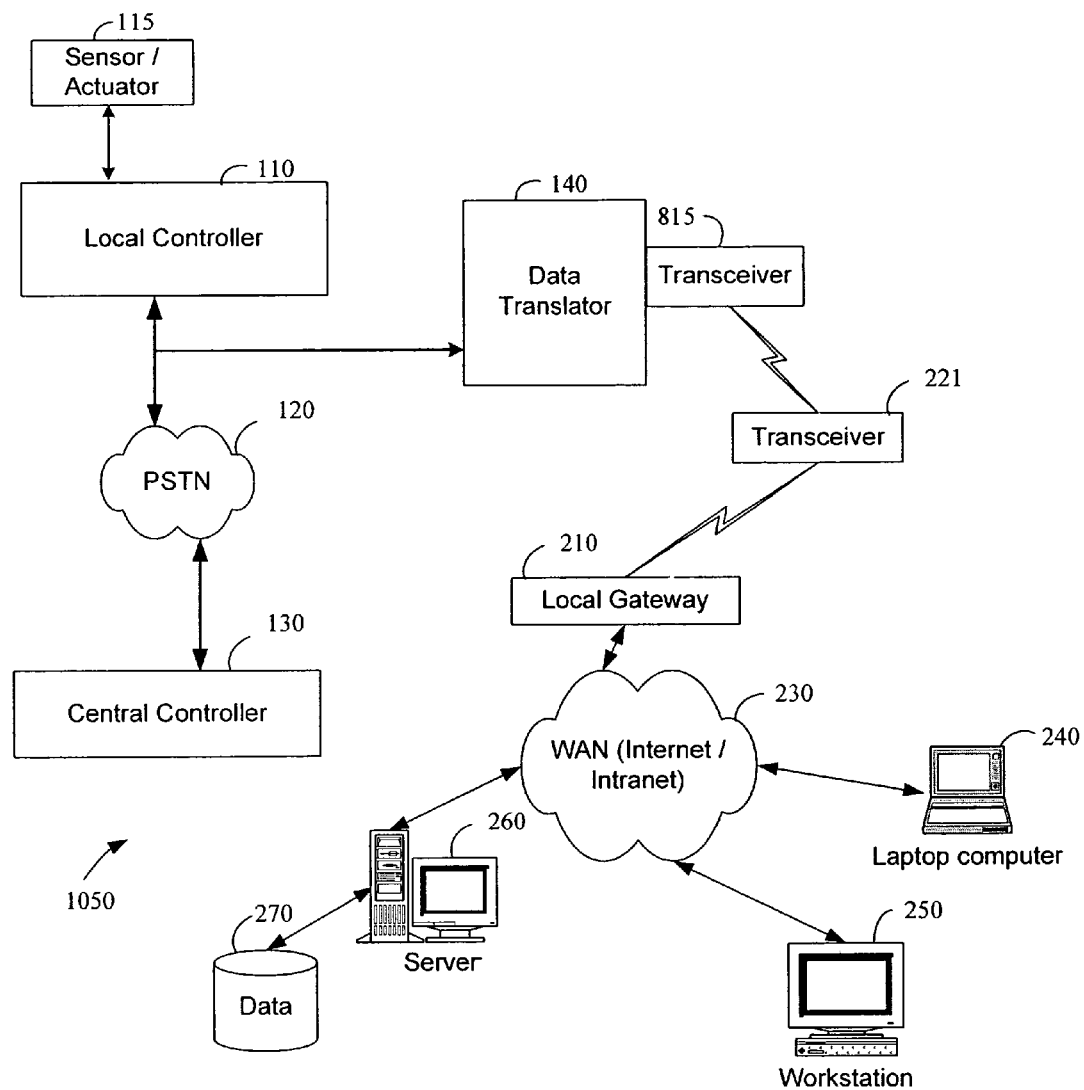
FIG. 13 is a block diagram illustrating the system of the present invention integrated with the local controller of FIG. 1.

Having described the message structure of a message of the present invention, reference is directed to FIG. 13 which illustrates the integration of the system of the present invention with the control system of FIG. 1. Having previously illustrated several variations consistent with the principles of the present invention, it will be appreciated by those skilled in the art that multiple variations of the present invention may be integrated with existing control systems. In this regard, an existing control system with local controller 110 and a plurality of sensor actuators 115 (one shown for simplicity of illustration) are in communication with central controller 130 via PSTN 120 as previously described. In a manner well known in the art of control systems, local controller 110 transmits appropriate status information via PSTN 120 to central controller 130.

Control systems consistent with the design of FIG. 1, as further illustrated in FIG. 13, require the routing of electrical conductors to each sensor and actuator as the application requires. It will be appreciated by those skilled in the art that the system of the present invention can take advantage of the infrastructure of an existing system by inserting data translator 140 such that system data is sent to both the central controller 130 in the old configuration, as well as, the data translator 140. Data translator 140 serves to convert system data to function codes as previously described. Once data translator 140 successfully converts the system data stream to the message protocol of the present invention, transceiver 815 further converts the system data stream to a RF signal.

As previously described in connection with FIG. 2, stand-alone transceiver 221 receives and repeats the RF data transmission received from transceiver 815. Local gateway 210 receives the RF data transmission repeated by stand-alone transceiver 221 and converts the RF data transmission into TCP/IP for further transmission across WAN 230 to server 260. In this regard, server 260 may further manage the data for internal storage or alternatively storage in database 270. Customers with WAN 230 access may access the system data from workstation 250 or laptop computer 240.

Figure 14:
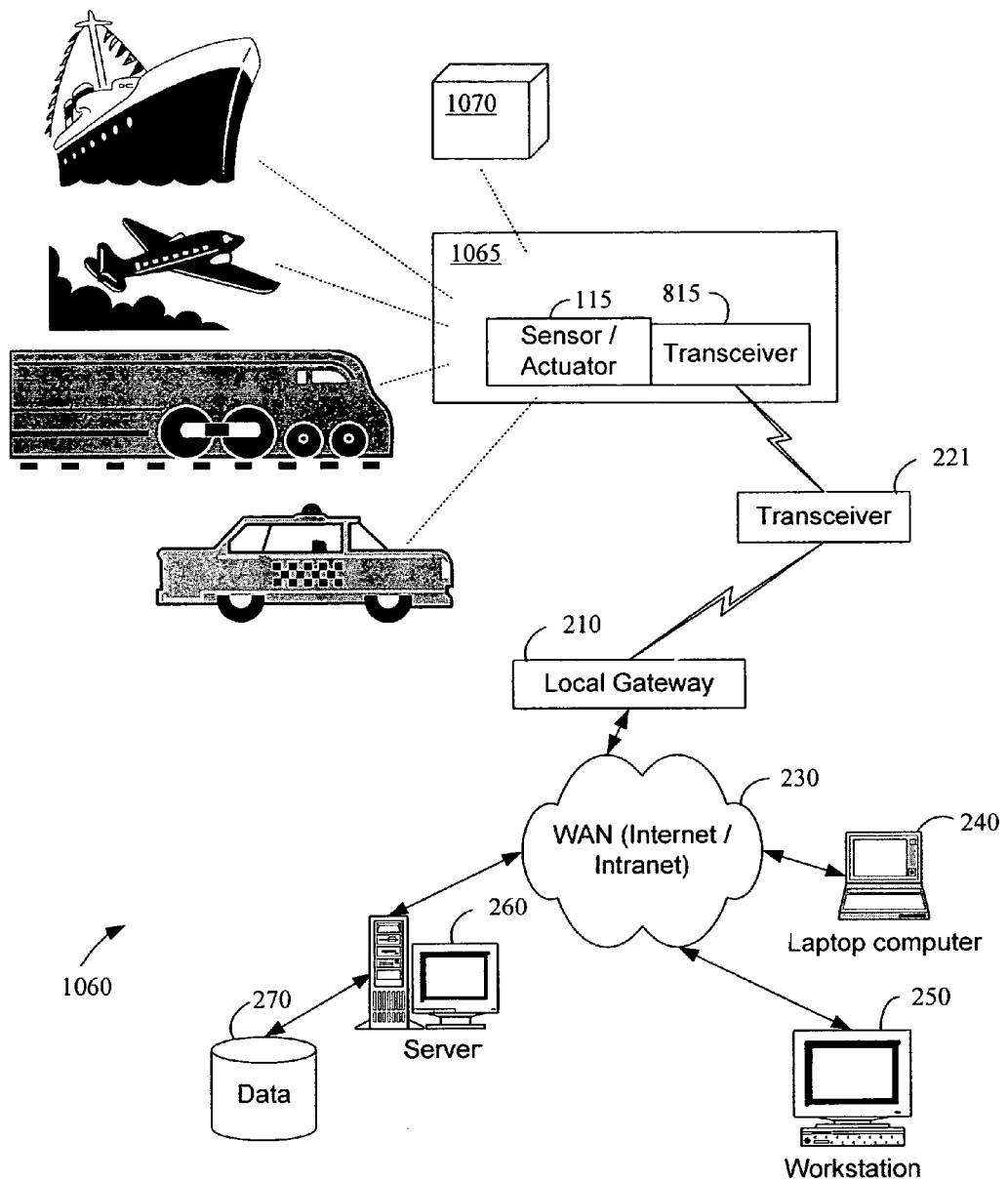
FIG. 14 is a block diagram illustrating the system of the present invention integrated with a mobile inventory unit.

Having described integration of the system of the present invention with the control system of FIG. 1 in FIG. 13, reference is now directed to FIG. 14 which illustrates integration of the system of the present invention with mobile inventory units. In this regard, system 1060 consists of the system of the present invention as previously illustrated and described in FIGS. 1 and 13. Having previously illustrated several variations consistent with the principles of the present invention, it will be appreciated by those skilled in the art that multiple variations of the present invention may be integrated with mobile inventory units 1070. In this regard, sensor/actuator 115 integrated with transceiver 815 in sensor-transceiver assembly 1065 is further integrated with any of a number of mobile inventory units 1070 (one sensor-transceiver unit 1065 shown for simplicity of illustration). It will be appreciated by those skilled in the art that as long as a mobile inventory unit 1070, herein represented by a package, ship, airplane, train, and a taxi are within the radio-frequency transmission and receiving range of stand-alone transceiver 221, the system of the present invention may be used to monitor, store and report information of and relating to mobile inventory unit 1070.

It will be further appreciated by those skilled in the art that the system of the present invention may be used to transfer information to adequately equipped mobile inventory units 1070. In this regard, shipping companies may use the present invention to update a database containing location and status information for each mobile inventory unit 1070 in the company fleet. Shipping companies may also transfer informative messages or other information using the system of the present invention.

In one embodiment, the present invention may be used to store, retrieve, and update maintenance information related to individual mobile inventory units. For example, federally registered airplanes must keep a maintenance log with the craft detailing all inspections, maintenance, and repairs. The system of the present invention could be used by fixed base operators (FBOs) who perform inspections and maintenance on aircraft to retrieve and update the aircraft maintenance log. In this way, FBOs located throughout the world will be able to retrieve and update an electronic version of the maintenance history of an aircraft. In addition, a properly configured system could also contain maintenance directives and other service bulletins related to the particular aircraft.

In yet another embodiment, a properly integrated sensor/actuator 115 with transceiver 815 may be used to monitor mobile inventory unit system parameters. For example, an airplane could be configured to monitor and report engine run time, time elapsed since the last recorded inspection of a particular type, and related system information. It will be appreciated by those skilled in the art that the system of the present invention may be integrated with remote units other than those shown. The ship, package, airplane, train, and taxi shown in FIG. 14 are for example only and not meant to limit the scope of the present invention.

It will be appreciated that the foregoing description has illustrated certain fundamental concepts of the invention, but that other additions and/or modifications may be made consistent with the inventive concepts. For example, the one-way transmitters illustrated in FIG. 3A and implemented in a control system as illustrated in FIG. 6 may be adapted to monitor the current status of water, gas, and other utility meters. One-way transmitters might further be used to monitor and report actual operational hours on rental equipment or any other apparatus that must be serviced or monitored on an actual run-time schedule.

The two-way transceivers of the current invention, may be adapted to monitor and apply control signals in an unlimited number of applications. By way of example only, two-way transceivers of the current invention can be adapted for use with pay type publicly located telephones, cable television set converter boxes, as well as, for use with a host of residential appliances and devices to enable a remote controllable home automation and security system.

In a geographic area appropriately networked with permanently located transceivers consistent with the invention, personal transmitters consistent with the invention can be used to monitor and control personnel access and egress from specific rooms or portions thereof within a controlled facility. Personal transmitters can further be configured to transfer personal information to public emergency response personnel, personal billing information to vending machines, or to monitor individuals within an assisted living community.

Two-way transceivers consistent with the present invention can be integrated to monitor and control a host of industrial and business applications as well. By way of example only, building automation systems, fire control systems, alarm systems, industrial trash compactors, and building elevators can be monitored and controlled with devices consistent with the present invention. In addition, courier drop boxes, time clock systems, automated teller machines, self-service copy machines, and other self-service devices can be monitored and controlled as appropriate. By way of further example, a number of environment variables that require monitoring can be integrated with the system of the present invention to permit remote monitoring and control. For instance, light levels in the area adjacent to automated teller machines must meet minimum federal standards, the water volume transferred by water treatment plant pumps, smokestack emissions from a coal burning power plant or a coke fueled steel plant oven may also be remotely monitored.

The two-way transceivers of the present invention may be further integrated with a voice-band transmitter and receiver. As a result, when a person presses, for example, the emergency button on his/her transmitter, medical personnel, staff members, or others may respond by communicating via two-way radio with the party in distress. In this regard, each transmitter may be equipped with a microphone and a speaker that would allow the person to communication information such as their present emergency situation, their specific location, etc.

The foregoing description has been presented for purposes of illustration and description. It is not intended to be exhaustive or to limit the invention to the precise forms disclosed. Obvious modifications or variations are possible in light of the above teachings. For example, it should be appreciated that, in some implementations, the transceiver identification number is not necessary to identify the location of the transmitter. Indeed, in implementations where the transmitter is permanently integrated into an alarm sensor other stationary device within a system, then the control system server and or local gateway could be configured to identify the transmitter location by the transmitter identification number alone. In will be appreciated that, in embodiments that do not utilize repeating transceivers, the transmitters will be configured to transmit at a higher RF power level, in order to effectively communicate with the control system local gateway.

The embodiment or embodiments discussed were chosen and described illustrate the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. A system for remote data collection, assembly, storage, and event detection and reporting, comprising:
   a computer configured to execute at least one computer program that formats and stores select information for retrieval upon demand from a remotely located device, said computer integrated with a wide area network (WAN);
   a plurality of transceivers dispersed geographically at defined locations, each transceiver electrically interfaced with a sensor and configured to receive select information and identification information transmitted from another nearby wireless transceiver electrically interfaced with a sensor in a predetermined signal type and further configured to wirelessly retransmit in the predetermined signal type the select information, the identification information associated with the nearby wireless transceiver, and transceiver identification information associated with the transceiver making retransmission; and
   at least one gateway connected to the wide area network configured to receive and translate the select information, the identification information associated with the nearby wireless transceiver, and transceiver identification information associated with one or more retransmitting transceivers, said gateway further configured to further transmit the translated information to the computer over the WAN.

2. A method for collecting information and providing data services, comprising:
   adaptively configuring at least one transmitter electrically interfaced with a sensor wherein the transmitter generates an information signal consisting of a transmitter identification code and an information field,
   wherein the information signal is received by another nearby transmitter electrically interfaced with a sensor and repeated in the same signal type as received to additional transmitters each electrically interfaced with a sensor for communicating the information signal to a gateway, the gateway providing access to a WAN;

translating the information signal within the gateway into a WAN compatible data transfer protocol;

transferring the information signal via the WAN to a computer wherein the computer is configured to manipulate and store data provided in the information signal; and granting client access to the computer.

3. The method of claim 2, wherein the WAN is the Internet.

4. The method of claim 2, wherein the step of adaptively configuring at least one transmitter electrically interfaced with a sensor is modified to include a global positioning system receiver.

5. A system for monitoring remote devices, comprising:

at least one sensor adapted to generate an electrical signal in response to a physical condition;

at least one wireless transmitter electrically interfaced with the sensor and configured to encode the electrical signal, the wireless transmitter further configured to transmit the encoded electrical signal and transmitter identification information in a radio-frequency (RF) signal;

one or more additional wireless transmitters each electrically interfaced with a sensor and configured to receive the RF signal and retransmit the RF signal;

at least one gateway connected a wide area network (WAN) configured to receive and translate the retransmitted RF signal, the gateway further configured to deliver the encoded electrical signal and transmitter identification information to a computer on the WAN; and a computer configured to execute at least one computer program that formats and stores select information responsive to the electrical signal for retrieval upon demand from a remotely located device.

6. The system of claim 5, wherein each wireless transmitter is configured to transmit a relatively low-power radio-frequency (RF) signal.

7. The system of claim 5, wherein the at least one gateway is permanently connected to the WAN.

8. The system of claim 5, wherein the gateway translates the encoded electrical signal, the transmitter identification, and the transceiver identification information into TCP/IP for communication over the WAN.

9. A system for controlling a remote device comprising:

a target remote device having an actuator to be controlled;

a computer configured to execute at least one computer program that generates at least one control signal responsive to a system input signal; said computer integrated with a wide area network (WAN);

a gateway connected to the WAN configured to receive and translate the at least one control signal a wireless transmitter coupled with the gateway for transmitting a wireless signal that contains the control signal;

a first wireless transceiver electrically interfaced with an actuator for receiving the wireless signal and further retransmitting the wireless signal to the target remote device; and logic coupled to the target remote device for extracting the control signal from the retransmitted wireless signal and imparting an action on the actuator in response to the extracted control signal.

10. The system of claim 9, further comprising:

a plurality of additional wireless transceivers each coupled to an actuator and configured to receive the wireless signal and to retransmit the wireless signal, wherein one of the plurality of additional wireless transceivers receive the wireless signal from the wireless transmitter and another one of the plurality of the additional wireless transceivers retransmits the wireless signal to the first wireless transceiver.

11. The system of claim 9, further comprising:

a plurality of additional wireless transceivers each coupled to an actuator or a sensor and configured to receive the wireless signal and to retransmit the wireless signal, wherein one of the plurality of additional wireless transceivers receive the wireless signal from the wireless transmitter and another one of the plurality of the additional wireless transceivers retransmits the wireless signal to the first wireless transceiver.

12. A system for remote data collection, assembly, storage, and event detection and reporting, comprising:

a computer configured to execute at least one computer program that formats and stores select information for retrieval upon demand from a remotely located device, said computer integrated with a wide area network (WAN);

a plurality of non-earth orbiting transceivers dispersed geographically at defined locations, each transceiver integrated with a sensor and configured to receive select information and identification information transmitted from another nearby wireless transceiver in a predetermined signal type and further configured to wirelessly retransmit in the predetermined signal type the select information, the identification information associated with the nearby transceiver and transceiver identification information associated with the transceiver making retransmission; and at least one gateway connected to the wide area network configured to receive and translate the select information, the identification information associated with the nearby wireless transceiver, and transceiver identification information associated with one or more retransmitting transceivers, said gateway further configured to further transmit the translated information to the computer over the WAN.

13. The system as defined in claim 12, wherein the at least one gateway is permanently connected to the WAN.

14. The system as defined in claim 12, wherein the gateway translates the encoded electrical signal, the transmitter identification, and the transceiver identification information into TCP/IP for communication over the WAN.

* * * * *